United States Patent
Suzuki

(10) Patent No.: US 9,444,369 B2
(45) Date of Patent: Sep. 13, 2016

(54) POWER CONVERSION APPARATUS AND ELECTRIC POWER STEERING APPARATUS HAVING THE SAME

(71) Applicant: DENSO CORPORATION, Kariya, Aichi-pref. (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 115 days.

(21) Appl. No.: 14/489,103

(22) Filed: Sep. 17, 2014

(65) Prior Publication Data

US 2015/0075898 A1 Mar. 19, 2015

(30) Foreign Application Priority Data

Sep. 18, 2013 (JP) ................................. 2013-193135

(51) Int. Cl.
*H02M 7/5387* (2007.01)
*B62D 5/04* (2006.01)

(52) U.S. Cl.
CPC .......... *H02M 7/53871* (2013.01); *B62D 5/046* (2013.01); *B62D 5/0472* (2013.01); *H02M 7/53875* (2013.01)

(58) Field of Classification Search
CPC ............. H02M 7/537; H02M 7/5387; H02M 7/53871; H02M 7/54; H02M 7/60; H02P 21/0035; H02P 21/06; H02P 21/146; H02P 27/08; B62D 5/04; B62D 5/046; B62D 5/0472; B62D 5/049
USPC ....... 363/109, 118, 120, 123, 127, 131, 132; 318/139, 400.02, 400.34, 801
See application file for complete search history.

(56) References Cited

U.S. PATENT DOCUMENTS

| | | | | |
|---|---|---|---|---|
| 5,955,862 A | * | 9/1999 | Nguyen Phuoc . | H02M 7/53875 318/801 |
| 7,057,361 B2 | * | 6/2006 | Kitahata ............... | H02M 5/458 318/139 |

(Continued)

FOREIGN PATENT DOCUMENTS

| JP | B2-2563226 | 9/1996 |
|---|---|---|
| JP | B2-3664040 | 4/2005 |
| JP | 2010-088260 | 4/2010 |
| JP | 2013-066340 | 4/2013 |

OTHER PUBLICATIONS

Suzuki, U.S. Appl. No. 14/489,073, filed Sep. 17, 2014.

(Continued)

*Primary Examiner* — Yemane Mehari
(74) *Attorney, Agent, or Firm* — Nixon & Vanderhye P.C.

(57) ABSTRACT

A power conversion apparatus includes: an inverter unit having high and low potential-side switching elements corresponding to each phase of a winding of a rotating electrical machine; a current detecting unit; a current obtaining unit obtaining a current detection value with a fixed interval sampling timing; and a control unit controlling the switching elements based on a PWM reference signal and a duty instruction value. The control unit includes: a phase current computing device; a voltage instruction value computing device; and a duty computing device. The phase current computing device computes a correction current based on positive and negative side corrected current detection values. The positive-side corrected current detection value is obtained when a duty is adjusted to a positive side, and the negative-side corrected current detection value is obtained when the duty is adjusted to a negative side.

8 Claims, 22 Drawing Sheets

(56) References Cited

U.S. PATENT DOCUMENTS

| | | | | |
|---|---|---|---|---|
| 8,803,455 B2* | 8/2014 | Imamura | ............... | B62D 5/046 318/400.17 |
| 8,963,479 B2* | 2/2015 | Suzuki | ............... | H02P 27/085 318/599 |
| 9,065,366 B2* | 6/2015 | Niemann | ............... | B60L 3/003 |
| 2012/0139461 A1 | 6/2012 | Suzuki et al. | | |
| 2013/0271047 A1 | 10/2013 | Imamura et al. | | |
| 2014/0021897 A1* | 1/2014 | Yamanaka | ............... | H02P 6/182 318/400.34 |

OTHER PUBLICATIONS

U.S. Appl. No. 14/489,103, filed Sep. 17, 2014, Power Conversion Apparatus and Electric Power Steering Apparatus Having the Same.
U.S. Appl. No. 14/489,073, filed Sep. 17, 2014, Power Conversion Apparatus and Electric Power Steering Apparatus and Electric Power Steering Apparatus Having the Same.

* cited by examiner

| VOLT VECTOR | SW IN ON-STATE | | |
|---|---|---|---|
| | U | V | W |
| INACTIVE VOLT VECTOR { V0 | LOW | LOW | LOW |
| ACTIVE VOLT VECTOR { V1 | UP | LOW | LOW |
| V2 | UP | UP | LOW |
| V3 | LOW | UP | LOW |
| V4 | LOW | UP | UP |
| V5 | LOW | LOW | UP |
| V6 | UP | LOW | UP |
| INACTIVE VOLT VECTOR { V7 | UP | UP | UP |

…

POWER CONVERSION APPARATUS AND ELECTRIC POWER STEERING APPARATUS HAVING THE SAME

CROSS REFERENCE TO RELATED APPLICATION

This application is based on Japanese Patent Application No. 2013-193135 filed on Sep. 18, 2013, the disclosure of which is incorporated herein by reference.

TECHNICAL FIELD

The present disclosure relates to a power conversion apparatus and an electric power steering apparatus having the same.

BACKGROUND

Conventionally, an inverter device for detecting current by current detecting device provided for a DC part in an inverter is known. In the case of detecting currents of respective phases by current detecting device provided for the DC part in the inverter, current has to be detected in an active voltage vector interval. Consequently, current detection cannot be performed at the peak of a PWM reference signal as a carrier signal, and a ripple component is included in a current detection value. To address the problem, for example, in Patent Literature 1, timings which are symmetrical with respect to the carrier peak are obtained, an average value is used as a phase current detection value at the carrier peak, and the average value is used as a current value at the carrier peak.

In Patent Literature 1, current has to be detected at timings which are symmetrical with respect to the carrier peak. Since sampling intervals vary according to the magnitude of voltage, the sampling intervals cannot be made constant. In addition, since the current detection is performed four times per PWM cycle, the frequency of the current detection is high. In the case where a zero-voltage vector period is long such as the case where application voltage is small or large, the current detection cannot be performed properly.

Patent Literature 1: Japanese Unexamined Patent Application Publication No. 2010-88260

SUMMARY

It is an object of the present disclosure to provide a power conversion apparatus realizing reduced distortion in current. It is another object of the present disclosure to provide an electric power steering apparatus having a power conversion apparatus realizing reduced distortion in current.

According to a first aspect of the present disclosure, a power conversion apparatus includes: an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine; a current detecting unit connected between the inverter unit and a positive side or a negative side of a DC power supply; a current obtaining unit obtaining a current detection value from the current detecting unit with a fixed interval sampling timing; and a control unit controlling an on-operation and an off-operation of the high-potential-side switching elements and the low-potential-side switching elements based on a PWM reference signal and a duty instruction value. The control unit includes: a phase current computing device computing a phase current of each phase, which flows through one of the phases of the winding, based on the current detection value; a voltage instruction value computing device computing a voltage instruction value, which relates to a voltage applied to the winding, based on the phase current of each phase; and a duty computing device computing the duty instruction value, based on the voltage instruction value, which is adjusted in such a manner that an active voltage vector interval for detecting the current detection value is equal to or longer than a predetermined period required to obtain the current detection value and the current detection value is detected with the fixed interval sampling timing. The phase current computing device computes a correction current as a corrected phase current of each phase based on a positive-side corrected current detection value and a negative-side current detection value. The positive-side corrected current detection value is obtained as the current detection value when a duty is adjusted to a positive side, and the negative-side corrected current detection value is obtained as the current detection value when the duty is adjusted to a negative side.

In the present disclosure, since the duty instruction value is adjusted so that the current detection value can be detected at the sampling timings as predetermined intervals, the current detection value can be obtained with the simple configuration.

The duty is corrected so that the active voltage vector interval in which the current detection value is detected becomes equal to or longer than a predetermined period. When the duty is corrected to the positive side, the ripple current also fluctuates to the positive side. When the duty is corrected to the negative side, the ripple current also fluctuates to the negative side. In the present disclosure, therefore, on the basis of the current detection values when the duty is corrected to the positive side and the current detection values when the duty is corrected to the negative side, the currents of the respective phases are corrected. Consequently, the ripple current can be properly corrected, so that a current detection error can be reduced. Since the current detection error is reduced and the distortion of the current is reduced, a torque ripple, sound, and vibration can be reduced.

According to a second aspect of the present disclosure, an electric power steering apparatus includes: a power conversion apparatus according to the first aspect of the present disclosure; and the rotating electrical machine for outputting an auxiliary torque assisting a steering operation of a driver.

In the above apparatus, since the duty instruction value is adjusted so that the current detection value can be detected at the sampling timings as predetermined intervals, the current detection value can be obtained with the simple configuration. Further, the ripple current can be properly corrected, so that a current detection error can be reduced. Since the current detection error is reduced and the distortion of the current is reduced, a torque ripple, sound, and vibration can be reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
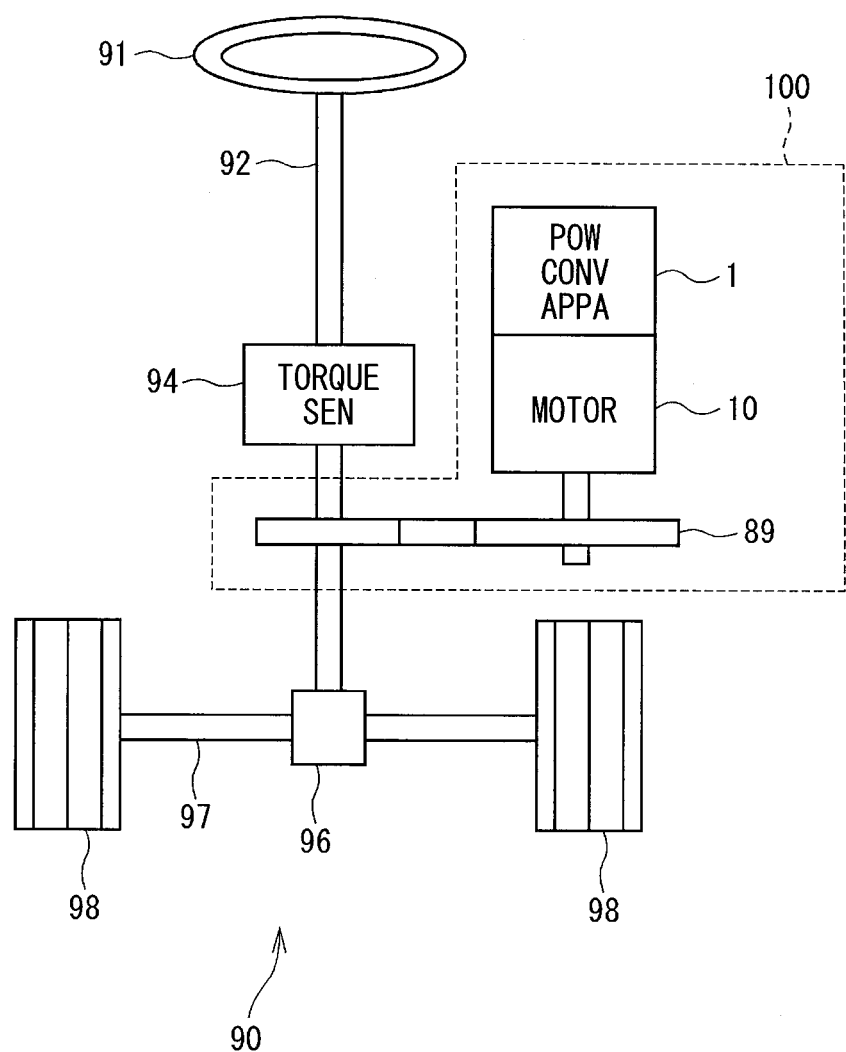
FIG. 1 is a schematic diagram illustrating an electric power steering apparatus according to a first embodiment of the present disclosure.

Hereinafter, a power conversion apparatus according to the present disclosure and an electric power steering apparatus using the same will be described with reference to the drawings.

First Embodiment

FIGS. 1 to 21 illustrate a power conversion apparatus according to a first embodiment of the present disclosure and an electric power steering apparatus using the same. Hereinafter, in a plurality of embodiments, the same reference numerals are designated to substantially the same configurations and their description will be repeated.

As illustrated in FIG. 1, a power conversion apparatus 1 is applied to, together with a motor 10 as a rotating electrical machine, for example, an electric power steering apparatus 100 for assisting steering operation of a vehicle.

FIG. 1 illustrates a general configuration of a steering system 90 having the electric power steering apparatus 100. The steering system 90 is constructed by a handle (steering wheel) 91, a steering shaft 92, a pinion gear 96, a rack shaft 97, wheels 98, the electric power steering apparatus 100, and the like.

The handle 91 is connected to the steering shaft 92. The steering shaft 92 is provided with a torque sensor 94 for detecting a steering torque which is supplied when the driver operates the handle 91. The pinion gear 96 is provided at the tip of the steering shaft 92, and the pinion gear 96 engages with the rack shaft 97. To both ends of the rack shaft 97, the pair of wheels 98 is coupled via tie rods or the like.

With the configuration, when the driver turns the handle 91, the steering shaft 92 connected to the handle 91 turns. The turning movement of the steering shaft 92 is converting to linear movement of the rack shaft 97 by the pinion gear 96, so that the pair of wheels 98 is steered at an angle according to the displacement amount of the rack shaft 97.

The electric power steering apparatus 100 includes the motor 10 which outputs an auxiliary torque assisting the steering of the handle 91 by the driver, the power conversion apparatus 1 used for controlling and driving the motor 10, a reduction gear 89 reducing the rotation of the motor 10 and transmitting the rotation to the steering shaft 92 or the rack shaft 97, and the like.

The motor 10 is driven when power is supplied from a battery 80 (refer to FIG. 2) to make the reduction gear 89 forward/reverse rotate.

The electric power steering apparatus 100 outputs the auxiliary torque for assisting the steering of the handle 91 from the motor 10 on the basis of signals from the torque sensor 94, a vehicle speed sensor for detecting vehicle speed, and the like and transmits it to the steering shaft 92 or the rack shaft 97.

Figure 2:
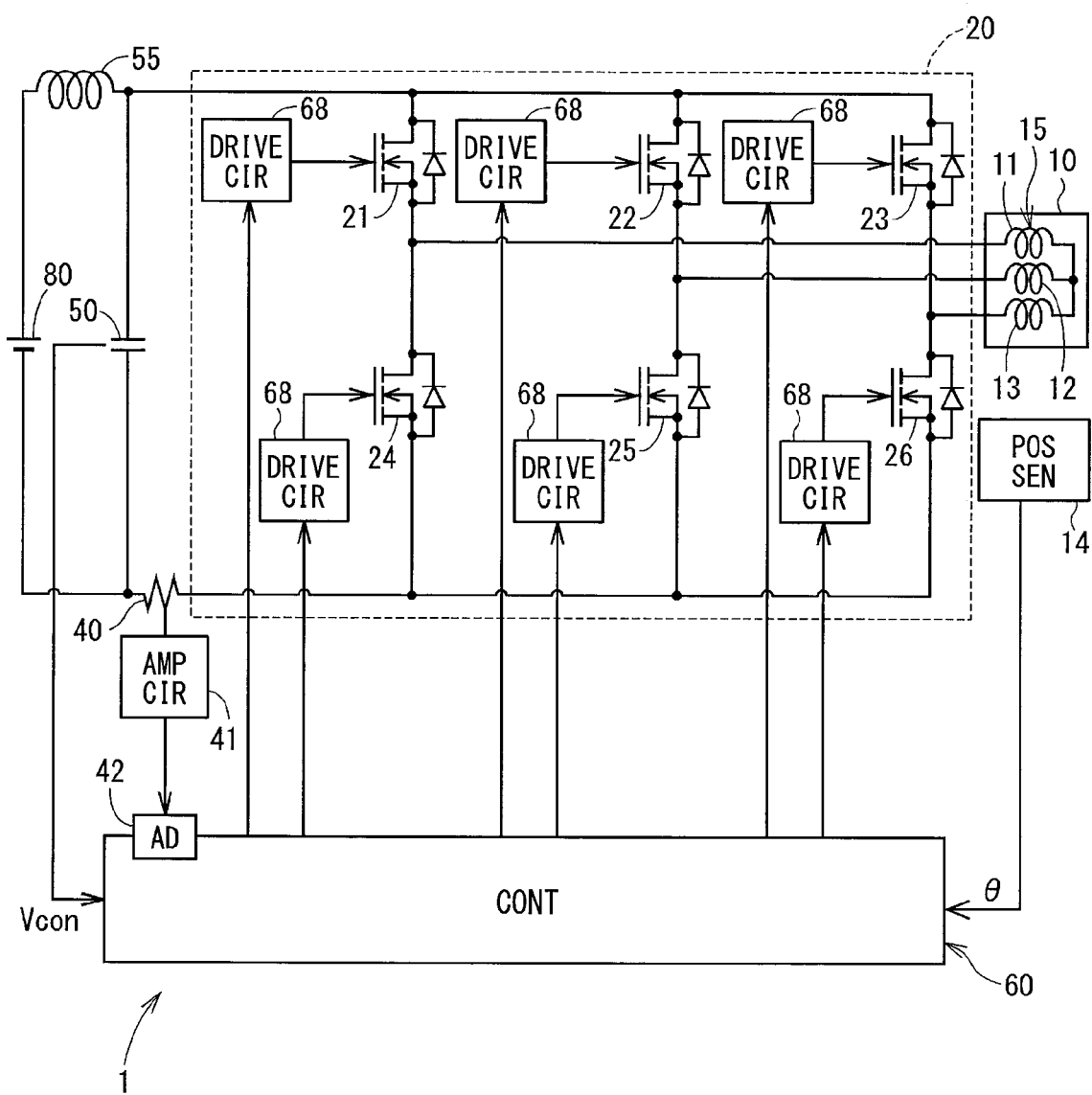
FIG. 2 is a schematic diagram illustrating the configuration of a power conversion apparatus according to the first embodiment of the disclosure.

The motor 10 is a three-phase brushless motor and has a rotor and a stator (which are not illustrated). The rotor is a cylindrical member. A permanent magnet is adhered to the surface of the motor and has a magnetic pole. The stator internally has the rotor so as to be relatively rotatable. The stator has projection parts which radially project every predetermined angle to the inside. Around the projections, a U-phase coil 11, a V-phase coil 12, and a W-phase coil 13 illustrated in FIG. 2 are wound. The U-phase coil 11, the V-phase coil 12, and the W-phase coil 13 construct a winding 15.

The motor 10 is also provided with a position sensor 14 for detecting an electric angle θ as the rotation position of the rotor.

As illustrated in FIG. 2, the power conversion apparatus 1 drives and controls the motor 10 by pulse width modulation (hereinbelow, called "PWM") and has an inverter unit 20, a shunt resistor 40 as a current detecting unit, an AD converter 42 as a current obtaining unit, a capacitor 50, a choke coil 55, a control unit 60, the battery 80 as a current power supply, and the like.

The inverter unit 20 is a three-phase inverter. Six switching elements 21 to 26 are bridge-connected to switch current application to the U-phase coil 11, the V-phase coil 12, and the W-phase coil 13. Although the switching elements 21 to 26 of the embodiment are MOSFETs (metal-oxide-semiconductor field-effect transistors) as a kind of the field-effect transistors, other transistors or the like may be also used. In the following, the switching elements 21 to 26 will be referred to as SW 21 to 26.

The drains of the three SW 21 to 23 are connected to the positive electrode side of the battery 80. The sources of the SW 21 to 23 are connected to the drains of the SW 24 to 26, respectively. The sources of the SW 24 to 26 are connected to the negative electrode side of the battery 80 via the shunt resistor 40.

The connection point of the SW 21 and the SW 24 as a pair is connected to one end of the U-phase coil 11. The connection point of the SW 22 and the SW 25 as a pair is connected to one end of the V-phase coil 12. The connection point of the SW 23 and the SW 26 as a pair is connected to one end of the W-phase coil 13.

Hereinafter, the SW 21 to 23 disposed on the high potential side will be properly referred to as "upper SW" and the SW 24 to 26 disposed on the low potential side will be properly referred to as "lower SW". As necessary, the corresponding phase is also written as "U upper SW 21". In the embodiment, the upper SW 21 to 23 correspond to "high-potential-side switching elements", and the lower SW 24 to 26 correspond to "low-potential-side switching elements".

The shunt resistor 40 is provided between the low potential side of the inverter unit 20 and the negative electrode of the battery 80 and detects bus current of the inverter unit 20. The voltage between both ends of the shunt resistor 40 is amplified by an amplification circuit 41 and the amplified voltage is output to the AD converter 42. The AD converter 42 samples and holds the voltage at predetermined sampling intervals and outputs an AD-converted current detection value Ic to a control unit 60.

The capacitor 50 and the choke coil 55 are provided between the battery 80 and the inverter unit 20 and construct a power filter. With the configuration, noise transmitted from other devices sharing the battery 80 is reduced. Noise transmitted from the inverter unit 20 side to the other devices sharing the battery 80 is also reduced. The capacitor 50 accumulates charges, thereby assisting power supply to the SW 21 to 26 and suppressing a noise component such as surge current. A voltage Vcon of the capacitor 50 is obtained by the control unit 60.

The control unit 60 controls the entire power conversion apparatus 1 and is constructed by a microcomputer executing various operations.

Figure 3:
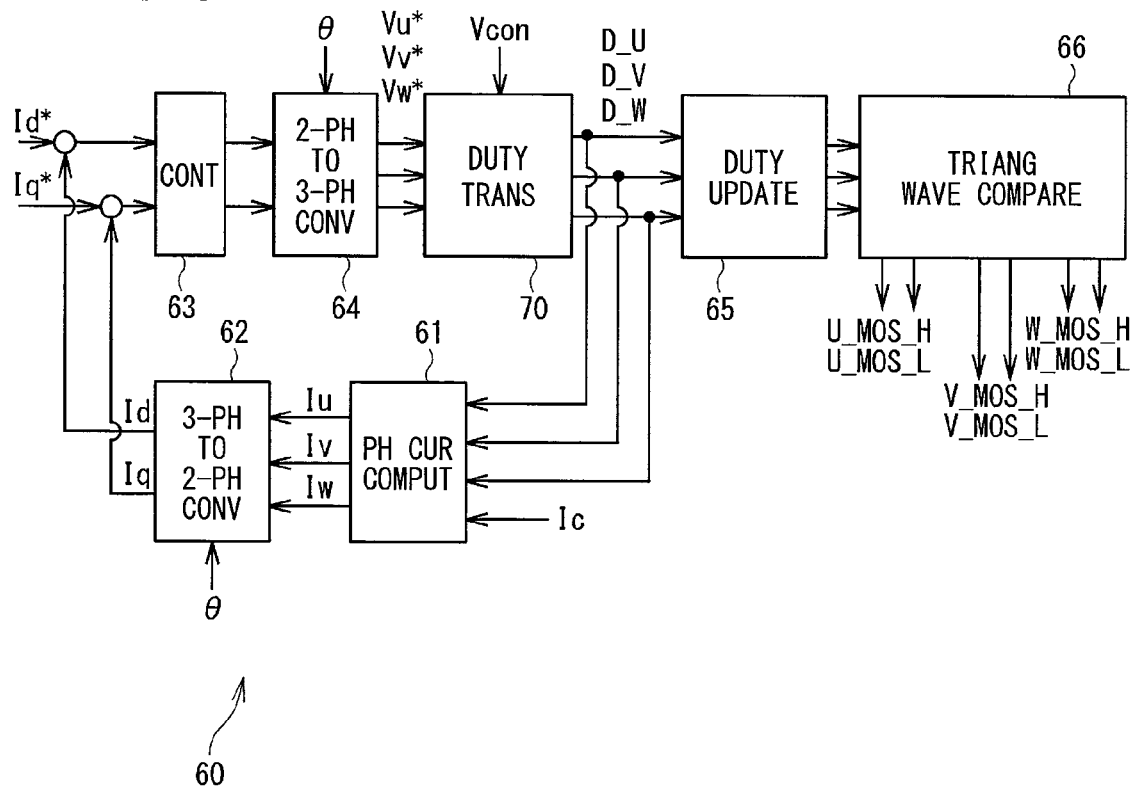
FIG. 3 is a block diagram illustrating the configuration of a control unit according to the first embodiment of the disclosure.

As illustrated in FIG. 3, the control unit 60 has a phase current computing unit 61, a three-phase to two-phase converting unit 62, a controller 63, a two-phase to three-phase converting unit 64, a duty transforming unit 70, a duty updating unit 65, a triangular wave comparing unit 66, and the like.

The phase current computing unit 61 computes a U-phase current Iu, a V-phase current Iv, and a W-phase current Iw on the basis of the current detection value Ic. Hereinafter, the U-phase current Iu, the V-phase current Iv, and the W-phase current Iw will be properly called three-phase currents Iu, Iv, and Iw.

The three-phase to two-phase converting unit 62 computes a d-axis current detection value Id and a q-axis current detection value Iq by dq conversion based on the three-phase currents Iu, Iv, and Iw and the electric angle θ.

The controller 63 performs current feedback operation based on a d-axis current instruction value Id*, a q-axis current instruction value Iq*, the d-axis current detection value Id, and the q-axis current detection value Iq to compute a d-axis voltage instruction value Vd* and a q-axis voltage instruction value Vq*. Specifically, a current deviation ΔId between the d-axis current instruction value Id* and the d-axis current detection value Id and a current deviation ΔIq between the q-axis current instruction value Iq* and the q-axis current detection value Iq are calculated, and the voltage instruction values Vd* and Vq* are computed so that the current deviations ΔId and ΔIq converge to zero in order to make the current detection values Id and Iq follow the current instruction values Id* and Iq*.

The two-phase to three-phase converting unit 64 computes a U-phase voltage instruction value Vu*, a V-phase voltage instruction value Vv*, and a W-phase voltage instruction value Vw* on the basis of the voltage instruction values Vd* and Vq* and the electric angle θ by inverse dq transformation. Hereinafter, the U-phase voltage instruction value Vu*, the V-phase voltage instruction value Vv*, and the W-phase voltage instruction value Vw* will be properly called voltage instruction values Vu*, Vv*, and Vw*, respectively.

The duty transforming unit 70 transforms the voltage instruction values Vu*, Vv*, and Vw* to a U-phase duty instruction value D_U, a V-phase duty instruction value D_V, and a W-phase duty instruction value D_W. Hereinafter, the U-phase duty instruction value D_U, the V-phase duty instruction value D_V, and the W-phase duty instruction value D_W will be properly called "duty instruction values D_U, D_V, and D_W" or simply called "duties".

Figure 4:
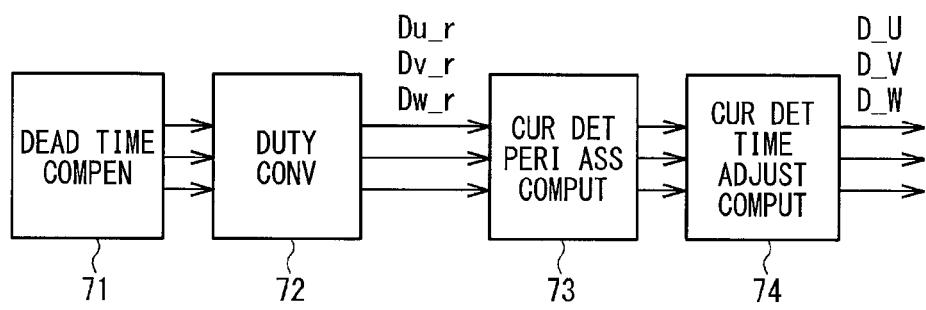
FIG. 4 is a block diagram illustrating the configuration of a duty converting unit according to the first embodiment of the disclosure.

As illustrated in FIG. 4, the duty transforming unit 70 is constructed by a dead time compensating unit 71, a duty converting unit 72, a current detection period assurance computing unit 73, and a current detection timing adjustment computing unit 74.

To avoid simultaneous turn-on of the upper SW 21 to 23 and the lower SW 24 to 26 as pairs, the dead time compensating unit 71 compensates the voltage instruction values Vu*, Vv*, and Vw* on the basis of a dead time compensation amount and computes dead time compensation values Vuc, Vvc, and Vwc so as to cancel out a change amount of the voltage applied to the coils 11 to 13 caused by the influence of the dead time.

The duty converting unit 72 converts the dead time compensation values Vuc, Vvc, and Vwc to duty conversion values Du_r, Dv_r, and Dw_r, respectively.

To assure time in which the current detection value Ic can be obtained, the current detection period assurance computing unit 73 corrects the duty conversion values Du_r, Dv_r, and Dw_r and computes first-half duty temporary values Du_at, Dv_at, and Dw_at and second-half duty temporary values Du_bt, Dv_bt, and Dw_bt.

The current detection timing adjustment computing unit 74 changes a neutral-point voltage so that the current detection value Ic can be detected at predetermined intervals and computes first-half duty instruction values Du_a1, Dv_a1, and Dw_a1 of a first cycle, second-half duty instruction values Du_b1, Dv_b1, and Dw_b1 of the first cycle, first-half duty instruction values Du_a2, Dv_a2, and Dw_a2 of a second cycle, and second-half duty instruction values Du_b2, Dv_b2, and Dw_b2 of the second cycle. In the embodiment, the first-half duty instruction values Du_a1, Dv_a1, and Dw_a1 of the first cycle, the second-half duty instruction values Du_b1, Dv_b1, and Dw_b1 of the first cycle, the first-half duty instruction values Du_a2, Dv_a2, and Dw_a2 of the second cycle, and the second-half duty instruction values Du_b2, Dv_b2, and Dw_b2 of the second cycle correspond to "duty instruction values D_U, D_V, and D_W".

The details of the computation in the current detection period assurance computing unit 73 and the current detection timing adjustment computing unit 74 will be described later.

Referring again to FIG. 3, the duty updating unit 65 sets and updates the duty instruction values D_U, D_V, and D_W computed by the duty transforming unit 70.

The triangular wave comparing unit 66 compares the duty instruction values D_U, D_V, and D_W with a PWM reference signal P as a triangular wave carrier signal and outputs a signal for switching the on/off state of the SW 21 to 26 to the drive circuit 68 (refer to FIG. 2). When a U_MOS_H signal is output, the upper SW 21 is turned on, and the lower SW 24 is turned off. When a U_MOS_L signal is output, the upper SW 21 is turned off, and the lower SW 24 is turned on. When a V_MOS_H signal is output, the upper SW 22 is turned on, and the lower SW 25 is turned off. When a V_MOS_L signal is output, the upper SW 22 is turned off, and the lower SW 25 is turned on. When a W_MOS_H signal is output, the upper SW 23 is turned on, and the lower SW 26 is turned off. When a W_MOS_L signal is output, the upper SW 23 is turned off, and the lower SW 26 is turned on.

In the embodiment, to avoid short-circuit which occurs when the upper SW 21 and the lower SW 24, the upper SW 22 and the lower SW 25, and the upper SW 23 and the lower SW 26 as pairs are turned on at the same time, a dead time period in which both of the upper SW 21 and the lower SW 24, the upper SW 22 and the lower SW 25, and the upper SW 23 and the lower SW 26 as pairs are turned off is provided.

Figure 5:
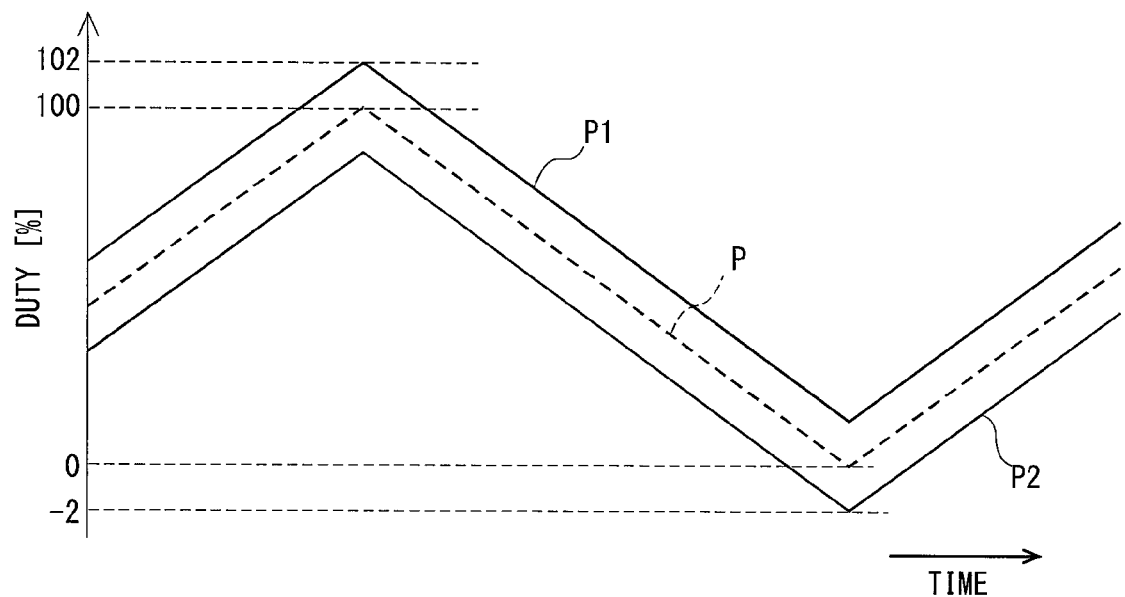
FIG. 5 is an explanatory diagram for explaining a PWM reference signal according to the first embodiment of the disclosure.

FIG. 5 illustrates a method of setting a dead time. The horizontal axis of FIG. 5 indicates time (which is not written in the diagram). In the embodiment, a triangular wave comparing method is employed. By comparing the duty instruction values D_U, D_V, and D_W calculated by the control unit 60 with the PWM reference signal P, the on/off operation of the SW 21 to 26 is controlled Concretely, when the duty exceeds the PWM reference signal P, the upper SW 21 to 23 are turned on. When the PWM reference signal P exceeds the duty, the lower SW 24 to 26 are turned on.

In the embodiment, a PWM reference signal P1 for upper SW obtained by shifting the PWM reference signal P having an amplitude of duty 0% to 100% to the upper direction and a PWM reference signal P2 for lower SW obtained by shifting the PWM reference signal to the lower direction are generated. By controlling the on/off state of the upper SW 21 to 23 on the basis of the PWM reference signal P1 for upper SW and the duty and controlling the on/off state of the lower SW 24 to 26 on the basis of the PWM reference signal p2 for lower SW and the duty, the dead time period is assured.

In the embodiment, the PWM reference signal P1 for upper SW is shifted by the amount of 2% in the upper direction from the PWM reference signal P. The PWM reference signal P2 for lower SW is shifted by the amount of 2% in the lower direction from the PWM reference signal P. Consequently, in the embodiment, for convenience, the range of duty is −2% to 102%. The duty corresponding to the dead time on the upper SW 21 to 23 side is the amount of 2%, and the duty corresponding to the dead time on the lower SW 24 to 26 side is the amount of 2%. In total, the duty corresponding to the dead time is 4%. Hereinafter, the duty corresponding to the dead time will be properly simply called "dead time". The length of the dead time can be properly set in consideration of the effective pulse width and other factors.

As illustrated in FIG. 5, in the case of providing the dead time by using the two PWM reference signals P1 and P2, a pulse smaller than the dead time cannot be output. Consequently, in a predetermined range from −2% as the lower limit of the duty and a predetermined range from 102% as the upper limit of the duty, the dead time at the time of output varies according to the duty.

A concrete example will be described with reference to FIGS. 6A and 6B and FIGS. 7A and 7B. In the description of FIGS. 6A and 6B and FIGS. 7A and 7B, in one cycle of the PWM reference signal P, the portion in which the upper SW 21 to 23 are on is called upper SW on duty, and the portion in which the lower SW 24 to 26 is on is called lower SW on duty. In the diagrams, on duty is abbreviated as "OD", and dead time is abbreviated as "DT".

Figure 6A:
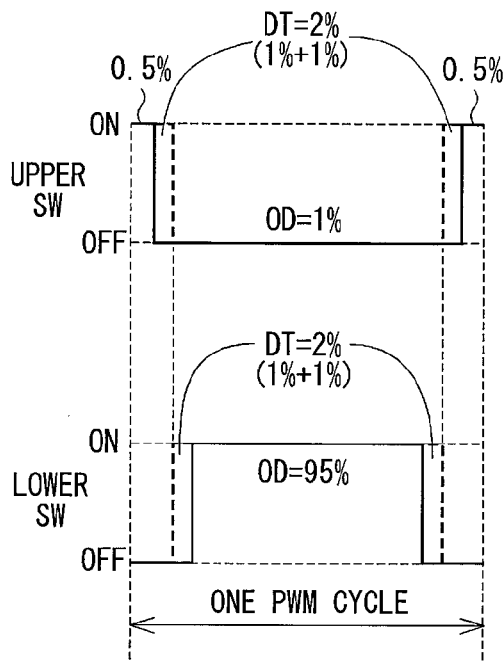
FIGS. 6A and 6B are explanatory diagrams for explaining a duty instruction and on/off operations of switching elements in the first embodiment of the disclosure.
Figure 6B:
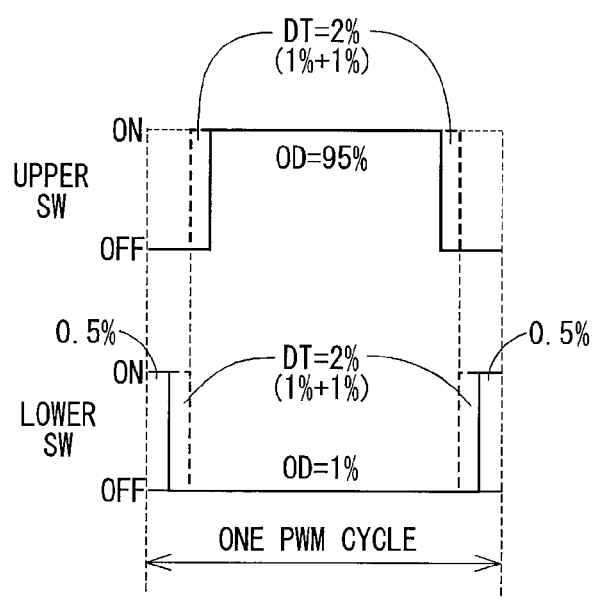

FIGS. 6A and 6B illustrate an example of the case where the dead time becomes the set dead time. For example, when the duty is 3%, the upper SW on duty becomes 1% obtained by subtracting 2% as the dead time amount on the upper SW side from 3%. The lower SW on duty becomes 95% obtained by subtracting 2% as the dead time amount on the lower SW side from 97% (=100%−3%). That is, since the upper SW on duty is 1% and the lower SW on duty is 95% when the duty is 3%, the dead time becomes 4% as the set dead time.

As illustrated in FIG. 6B, also in the case where the duty is 97%, the dead time is similar to the above.

Figure 7A:
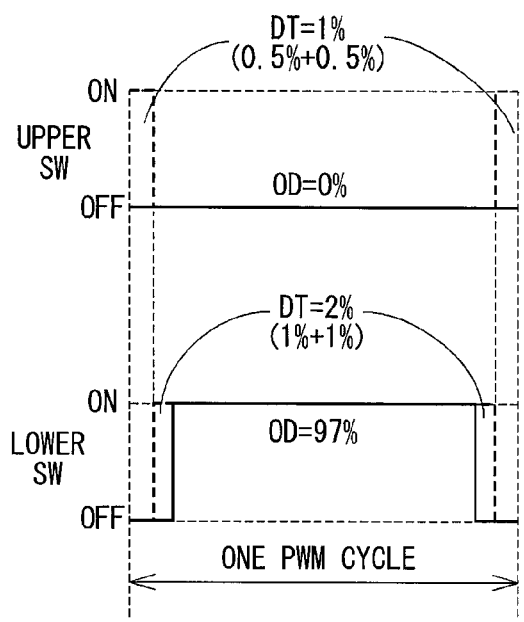
FIGS. 7A and 7B are explanatory diagrams for explaining the duty instruction value and the on/off operations of the switching elements in the first embodiment of the disclosure.
Figure 7B:
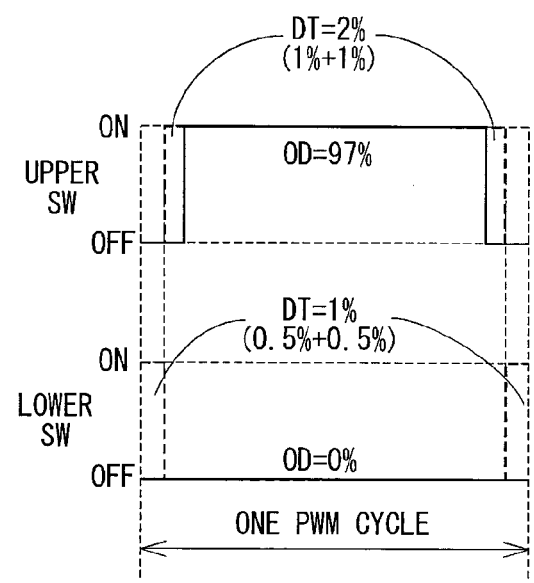

FIGS. 7A and 7B illustrate an example of the case where the dead time does not become the set dead time. When the duty is 2% or higher, the upper SW on duty is calculated by subtracting 2% as the dead time amount on the upper SW side from the duty. On the other hand, when the duty is less than 2%, the upper SW on duty cannot be made smaller than 0%. Consequently, for example, when the duty is 1%, the dead time on the upper SW side is set to 1%, and the upper SW on duty when the duty is 1% is set to 0%, so that the upper SW are not turned on. The lower SW on duty becomes 97% obtained by subtracting 2% as the dead time amount on the lower SW side from 99% (=100%−1%). That is, since the upper SW on duty is 0% and the lower SW on duty is 97% when the duty is 1%, the dead time becomes 3% which is different from 4% as the set value.

As illustrated in FIG. 7B, also in the case where the duty is 99%, the dead time is similar to the above.

That is, in the range where the duty is 2% to 98%, the dead time is 4% as the set value. However, when the duty is −2% to 2% as the predetermined range from the lower limit of the duty and when the duty is to 98% to 102% as the predetermined range from the upper limit of the duty, the dead time is smaller than the set value. The length of the dead time changes according to the duty. Consequently, in the case of uniformly performing dead time compensation of the amount 4% by the dead time compensating unit 71, the compensation is performed more than the amount in which the compensation has to be originally performed. In the range of the duty of −2% to 2% and the range of the duty of 98% to 102%, distortion occurs in line voltage.

Figure 8A:
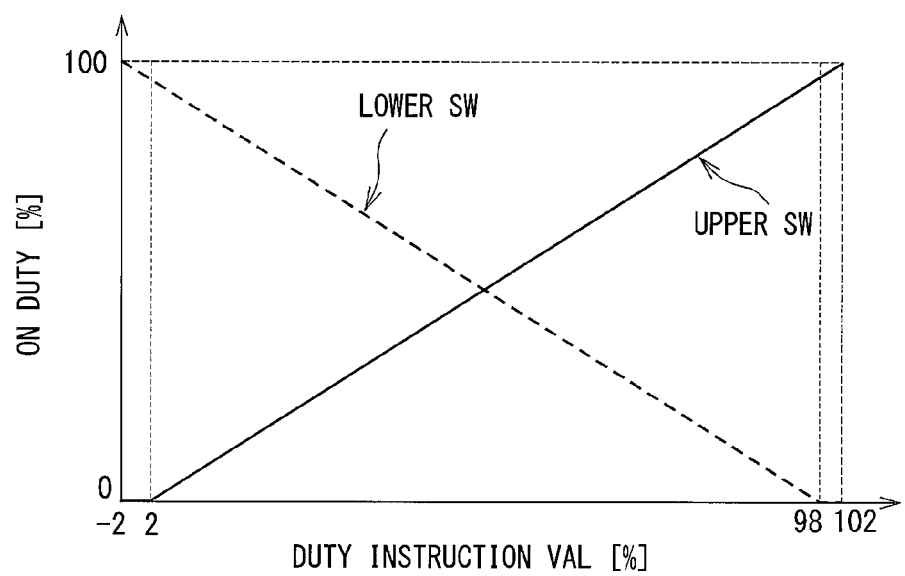
FIGS. 8A and 8B are explanatory diagrams illustrating the relation between the duty instruction value and a duty at which the switching elements are turned on and the relation between the duty instruction value and application voltage, respectively.
Figure 8B:
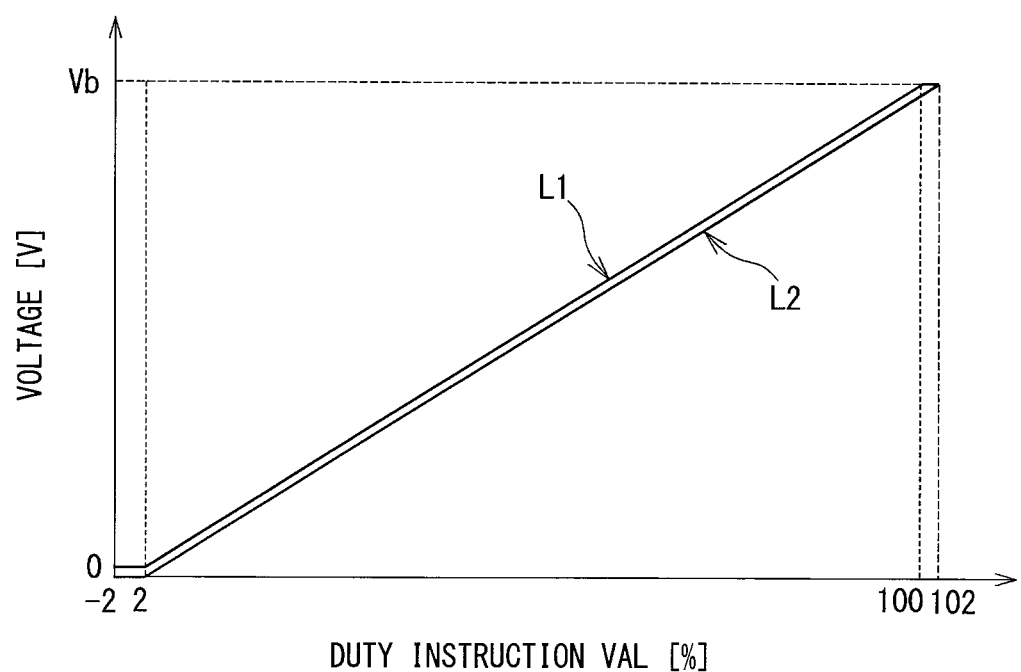

FIG. 8A illustrates the relations of the duty instruction values D_U, D_V, and D_W and the upper SW on duty and the lower SW on duty, and FIG. 8B illustrates the relations of the duty instruction values D_U, D_V, and D_W and application voltages.

In the embodiment, the PWM reference signal P1 for upper SW related to the on/off control on the upper SW 21 to 23 is shifted upward only by the amount of 2%. Consequently, as illustrated by the solid line in FIG. 8A, 0% to 100% in the upper SW on duty corresponds to 2% to 102% of the duty instruction values D_U, D_V, and D_W. Since the PWM reference signal P2 for lower SW related to the on/off control on the lower SW 24 to 26 is shifted downward only by the amount of 2%, as illustrated by the broken line in FIG. 8A, 0% to 100% in the lower SW on duty corresponds to 98% to −2% of the duty instruction.

As illustrated in FIG. 8B, when the phase current is negative, as illustrated by the solid line L1, the terminal voltage of each phase becomes a predetermined value at the duty instruction value of 2% or less and becomes battery voltage Vb at the duty instruction value of 100% or higher. When the phase current is positive, as illustrated by the solid line L2, the terminal voltage of each phase becomes zero at the duty instruction value of 2% or less and becomes the battery voltage Vb at the duty instruction value of 102%.

As described above, in the case of switching the on/off operation of the SW 21 to 26 by the triangular wave comparing method, when the duty within the predetermined range from the upper limit of the duty or within the predetermined range from the lower limit of the duty is output, the instruction voltage and the duty do not match, and the current waveform is distorted.

In the embodiment, therefore, the duties in the range where the instruction voltage and the duty do not match due to the influence of the dead time, that is, in the predetermined range from −2% as the lower limit of the duty or the predetermined range from 102% as the upper limit of the duty is set as an output avoidance duty, and the PWM control is performed without using a duty in the range.

When the output avoidance duty is provided, the period corresponding to the output avoidance duty including the lower or upper end of the PWM reference signals P1 and P2 becomes a "zero voltage vector" in which all of the upper SW 21 to 23 or all of the lower SW 24 to 26 are on. It is also possible to provide a zero voltage vector interval twice in each of the first-half period and the second-half period of the PWM reference signal.

The case of changing the duty in one cycle of the PWM cycle in the triangular wave comparing method will be explained with reference to FIG. 9. Although the U phase will be described as an example in FIG. 9, description of the other phases is similar. In the embodiment, a cycle starting from the lower end of the PWM reference signal to the next lower end is set as a "PWM cycle", the period from the starting lower end to the upper end is called the "first-half period", and the period from the upper end to the next lower end is called the "second-half period".

Figures 9, 10:
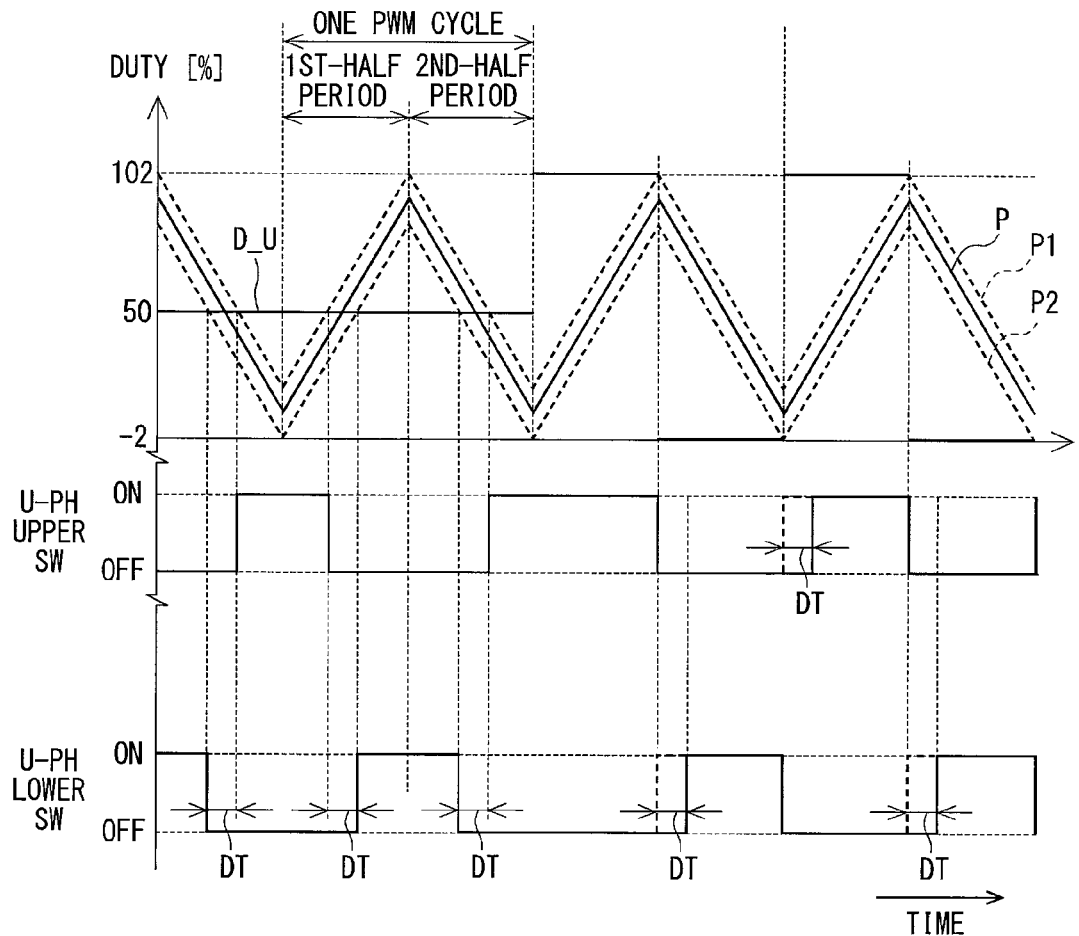
FIG. 9 is an explanatory diagram for explaining dead time in the case of switching the duty between the first half and the latter half of one PWM cycle.
FIG. 10 is an explanatory diagram illustrating the relation between the switching elements which are on and voltage vector patterns.

As illustrated in FIG. 9, when the duty of one PWM cycle is set to 50%, the dead time as the set value can be assured.

Even when the duty is switched between the first-half period and the second-half period, is set to, for example, 102% in the first-half period and is set to −2% in the second-half period, in one PWM cycle, a voltage equivalent to that in the case of performing a control with the duty of 50% is theoretically applied.

However, in the case of switching the duty over the PWM reference signals P1 and P2 in such a manner that 102% is set in the first-half period and −2% is set in the second-half period, a drive signal which simultaneously switching the upper and lower SW is output in association with the switching of the duty. In this case, by forcedly delaying the turn-on timing of the SW which is switched from the off state to the on state by another process, the dead time is assured, and a short circuit caused when the upper and lower SW are turned on simultaneously is avoided. Consequently, the pulse of the drive signal for the SW which is switched from the off state to the on state is reduced by the amount of the dead time.

Concretely, in the case of switching the duty from 102% to −2%, the drive signal for the lower SW 24 is reduced. In the case of switching the duty from −2% to 102%, the drive signal for the upper SW 21 is reduced.

Therefore, when the duty is switched over the PWM reference signals P1 and P2, an output as the set value cannot be output, and distortion occurs in the line voltage.

For example, in the case of switching the duty from 50% to 100% on the upper side of the PWM reference signal P1 for upper SW, switching of the on/off state accompanying the switching of the duty does not occur, and there is no influence on the pulse of the drive signal.

Similarly, for example, in the case of switching the duty from 50% to 0% on the lower side of the PWM reference signal P2 for lower SW, no switching of the on/off state accompanying the switching of the duty occurs, and there is no influence on the pulse of the drive signal.

Next, the voltage vector pattern will be described.

As illustrated in FIG. 10, combinations of the on/off state of the SW 21 to 26 are eight kinds of voltage vectors V0 to V7. The voltage vector V0 in which all of the lower SW 24 to 26 are on and the voltage vector V7 in which all of the upper SW 21 to 23 are on are "zero voltage vectors". At the time of the zero voltage vector, the line-to-line voltage is zero, and no voltage is applied to the coils 11 to 13.

The voltage vectors V1 to V6 are "active voltage vectors". In the valid voltage vectors, voltage is generated between the phase in which the upper SW is on and the phase in which the lower SW is on, and voltage is applied to the coils 11 to 13.

In odd-numbered voltage vectors as the voltage vectors V1, V3, and V5, one upper SW is on and two lower SW are on.

In even-numbered voltage vectors as the voltage vectors V2, V4, and V6, two upper SW are on and one lower SW is on.

Figure 11A:
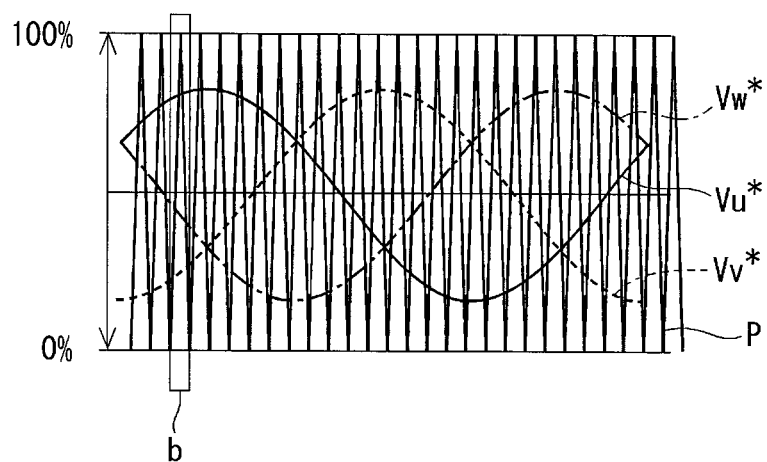
FIGS. 11A and 11B are explanatory diagrams for explaining the relation between the voltage instruction values and the voltage vector patterns in the first embodiment of the disclosure.
Figure 11B:
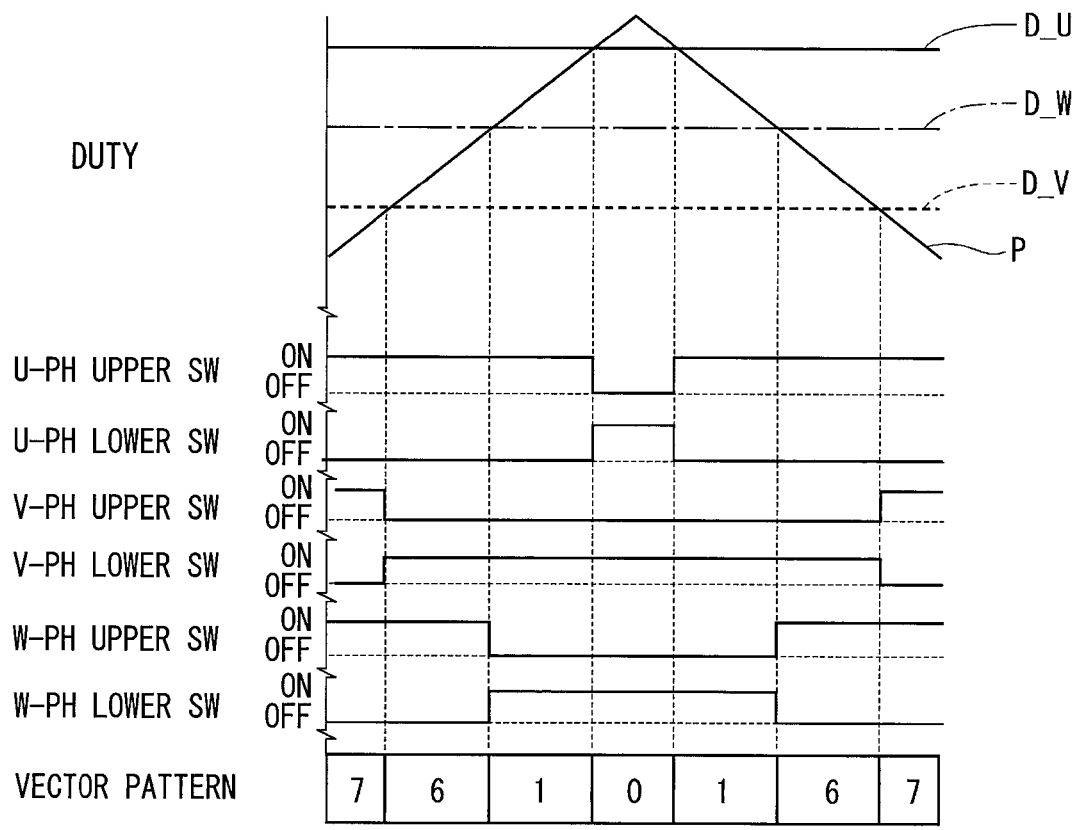

Subsequently, a voltage vector pattern in the triangular wave comparing method will be described with reference to FIGS. 11A and 11B. FIG. 11B is a diagram of duties obtained by converting the voltage instruction values Vu*, Vv*, and Vw* with respect to a region "b" in FIG. 11A.

As illustrated in FIG. 11B, each of the voltage instruction values Vu*, Vv*, and Vw* of the different phases is converted to a duty on the basis of a capacitor voltage Vcon. To simplify explanation, an example of controlling the on/off state of the SW 21 to 26 on the basis of duty conversion values Vu_r, Vv_r, and Vw_r before a correcting process and an adjusting process and a PWM reference signal P before a shift in which dead time is not considered will be described. In the following drawings, the example will be similar.

In one PWM cycle illustrated in FIG. 11B, the voltage vector switches in order of V7→V6→V1→V0→V1→V6→V7. In such a manner, in one PWM cycle, the voltage vector switches in order of voltage vector V7→even-numbered voltage vector→odd-numbered voltage vector→voltage vector V0→odd-numbered voltage vector→even-numbered voltage vector→voltage vector V7.

The interval of the voltage vector V1 as an odd-numbered voltage vector corresponds to the difference between a U-phase duty as the largest duty in the period and a W-phase duty as an intermediate duty.

The interval of the voltage vector V6 as an even-numbered voltage vector corresponds the difference between a W-phase duty as the intermediate duty and a V-phase duty as the smallest duty in the period.

The sum of the interval of the voltage vector V1 and the interval of the voltage vector V6 as active voltage vectors, corresponds to the difference between a U-phase duty as the largest duty and a V-phase duty as the smallest duty.

That is, each of the odd-numbered voltage vector interval, the even-numbered voltage vector interval, and the active voltage vector interval has length according to the difference of corresponding duties. Hereinafter, the difference of duties corresponding to an odd-numbered voltage vector interval will be called "odd-numbered voltage duty Do", the difference of duties corresponding to an even-numbered voltage vector interval will be called "even-numbered voltage duty De", and the difference of duties corresponding to an active voltage vector interval will be called "active voltage duty Da".

In the embodiment, current is detected in the shunt resistor 40 provided for the DC bus. In this case, current is detected in the active voltage vector interval. The current detection value Ic detected in the active voltage vector interval corresponds to current of a phase different from the other two phases of the arm of a SW which is on.

That is, the current detection value Ic detected in the voltage vector V1 corresponds to a U-phase current Iu, the current detection value detected in the voltage vector V2 corresponds to a W-phase current Iw, and the current detection value Ic detected in the voltage vector V3 corresponds to a V-phase current Iv. The current detection value Ic detected in the voltage vector V4 corresponds to the U-phase current Iu, the current detection value Ic detected in the voltage vector V5 corresponds to the W-phase current Iw, and the current detection value Ic detected in the voltage vector V6 corresponds to the V-phase current Iv.

In the embodiment, in one PWM cycle, the current detection value Ic is detected at timings of two active voltage vectors at which currents of different phases can be detected. The phase current computing unit 61 computes the currents Iu, Iv, and Iw of the respective phases on the basis of a current detection value Ic and the voltage vector at the time of detecting the current detection value Ic.

The example illustrated in FIG. 11B will be described. For example, the current detection value Ic of the first time is detected at the timing of the voltage vector V6 in the first-half period, and the current detection value Ic of the first time is detected at the timing of the voltage vector V1 in the second-half period. The phase current computing unit 61 computes the V-phase current Iv on the basis of the current detection value Ic of the first time, and computes the U-phase current Iu on the basis of the current detection value Ic of the second time. Since the sum of three phases=0, the W-phase current Iw is computed.

In the case of detecting the current detection value Ic in the shunt resistor 40, time (for example, 4.5 μseconds) in which ringing converges and hold time in which the on/off state of the SW 21 to 26 is not switched has to be assured. Since the current detection is performed in the active voltage vector in the embodiment, the length of the active voltage vector interval in which current detection is performed has to be set to equal to or longer than a predetermined period.

For example, in the case where the voltage instruction values Vu*, Vv*, and Vw* are relatively apart from one another as illustrated in FIG. 11B, the active voltage vector intervals are long. Consequently, the current can be detected at the timings of the active voltage vectors.

Figure 12A:
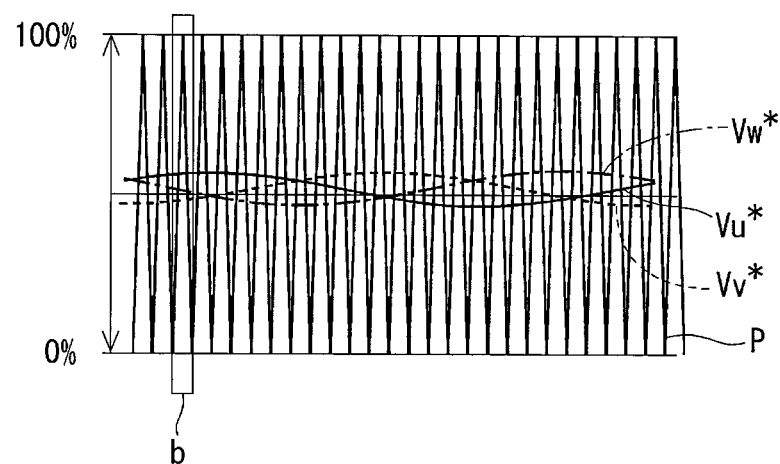
FIGS. 12A and 12B are explanatory diagrams for explaining the relation between the voltage instruction values and the voltage vector patterns in the first embodiment of the disclosure.
Figure 12B:
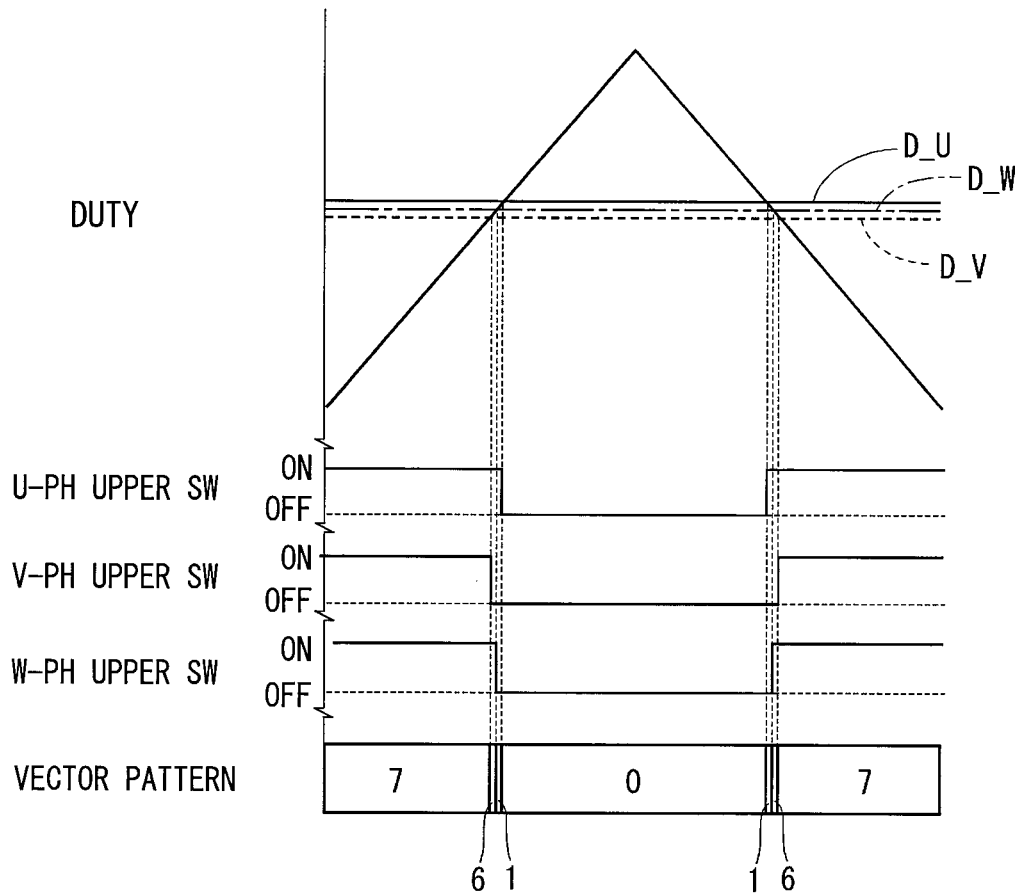

On the other hand, when the amplitudes of the voltage instruction values Vu*, Vv*, and Vw* are small as illustrated in FIG. 12A, the active voltage vector intervals are short, so that the current cannot be detected.

Figure 13A:
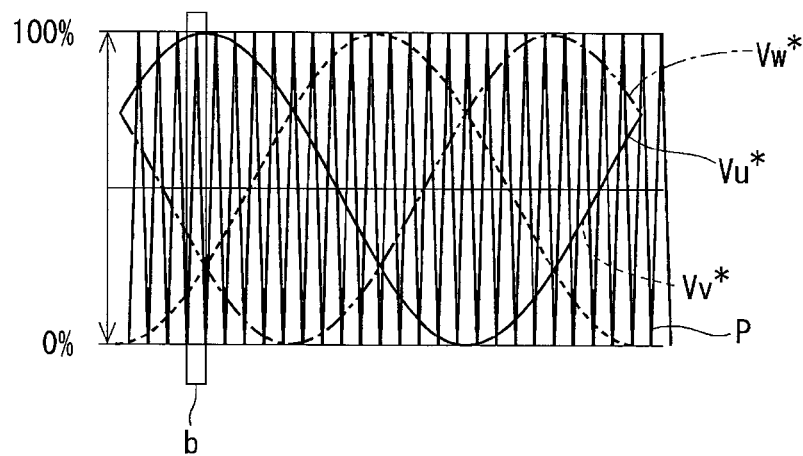
FIGS. 13A and 13B are explanatory diagrams for explaining the relation between the voltage instruction values and the voltage vector patterns in the first embodiment of the disclosure.
Figure 13B:
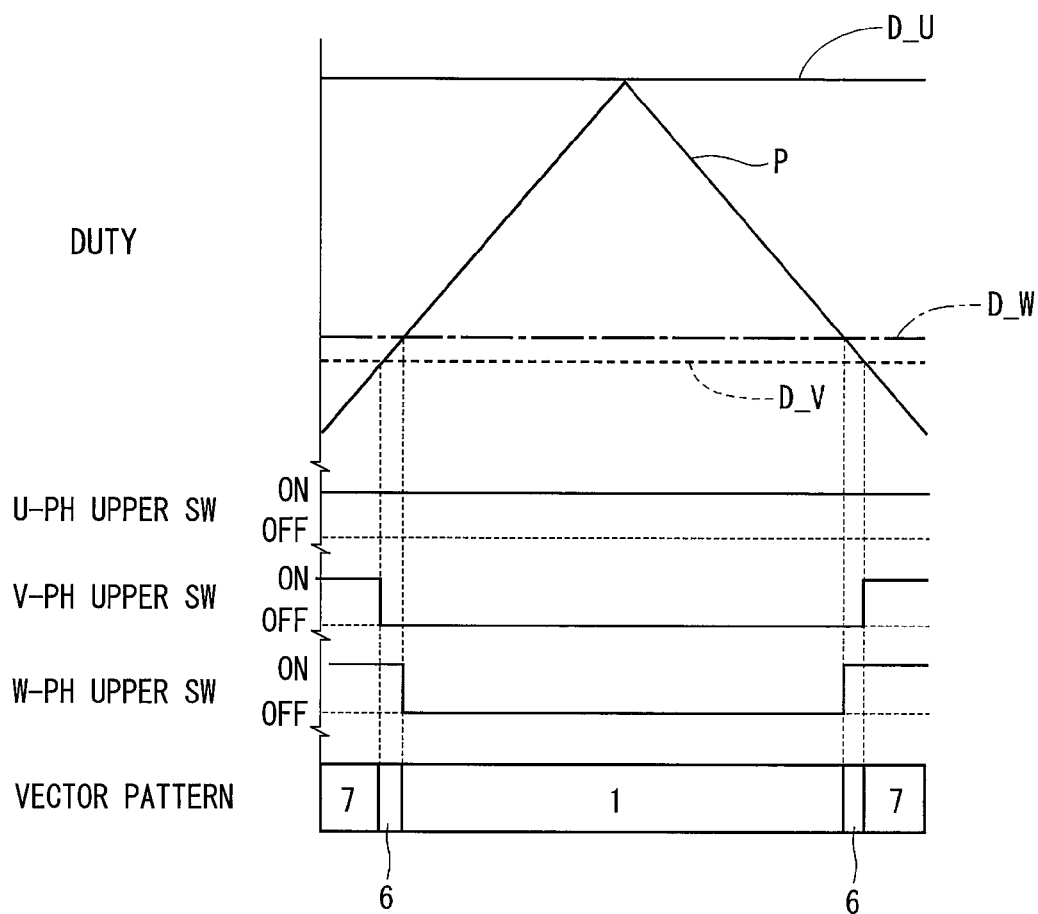

As illustrated in FIG. 13A, in the case where voltage instruction values of two phases are close to each other even though the amplitudes of the voltage instruction values Vu*, Vv*, and Vw* are large, only the current of one phase can be detected, and the currents Iu, Iv, and Iw of the respective phases cannot be computed. In FIGS. 12A and 12B and FIGS. 13A and 13B, on/off signals of the lower SW 24 to 26 are not illustrated.

As described above, each of the intervals of the active voltage vectors has length according to the difference of corresponding duties. In the embodiment, therefore, by correcting the duty conversion values Du_r, Dv_r, and Dw_r by the current detection period assurance computing unit 73, the active voltage vector interval of the current detection timing becomes equal to or longer than a predetermined period. Concretely, the duty conversion values Du_r, Dv_r, and Dw_r are corrected so that the difference of duties corresponding to an active voltage vector interval for performing current detection becomes a duty lower-limit value Dm corresponding to the predetermined time. In other words, when the difference of duties is equal to or larger than the current detection duty lower-limit value Dm, current can be detected in the active voltage interval corresponding to the difference of the duties.

The correcting process in the current detection period assurance computing unit 73 will be described with reference to the flowcharts of FIGS. 14 and 15.

In the first step S101 (hereinbelow, "step" will be simply indicated by reference character "S"), the magnitude relations of the duty conversion values Du_r, Dv_r, and Dw_r are determined. On the basis of the duty conversion values Du_r, Dv_r, and Dw_r, the odd-numbered voltage duty Do, the even-numbered voltage duty De, and the active voltage duty Da before correction are specified.

When the largest duty in the duty conversion values Du_r, Dv_r, and Dw_r before the correcting process is expressed as a first duty D1, the second largest duty is expressed as a second duty D2, and the smallest duty is expressed as a third duty D3, the odd-numbered voltage duty Do, the even-numbered voltage duty De, and the active voltage duty Da are expressed by the following equations (1), (2), and (3), respectively.

$$Do = D1 - D2 \quad (1)$$

$$De = D2 - D3 \quad (2)$$

$$Da = D1 - D3 \quad (3)$$

In S102, whether the amplitude of the voltage instruction values Vu*, Vv*, and Vw* is less than a first predetermined value THa1 or not is determined. In the case where it is determined that the amplitude of the voltage instruction values Vu*, Vv*, and Vw* is less than the first predetermined value THa1 (YES in S102), the routine shifts to S104. In the case where it is determined that the amplitude of the voltage instruction values Vu*, Vv*, and Vw* is equal to or larger than the first predetermined value THa1 (NO in S102), the routine shifts to S103.

In S103, whether the amplitude of the voltage instruction values Vu*, Vv*, and Vw* is less than a second predetermined value THa2 as a value larger than the first predetermined value THa1 or not is determined. In the case where it is determined that the amplitude of the voltage instruction values Vu*, Vv*, and Vw* is less than the second predetermined value THa2 (YES in S103), the routine shifts to S105. In the case where it is determined that the amplitude of the voltage instruction values Vu*, Vv*, and Vw* is equal to or larger than the second predetermined value THa2 (NO in S103), the routine shifts to S112 in FIG. 15.

In S104 to which the routine shifts in the case where it is determined that the amplitude of the voltage instruction values Vu*, Vv*, and Vw* is equal to or larger than the first predetermined value THa1 (NO in S102), the first duty correction value C1 as a correction value for the first duty D1 is expressed by the equation (4), the second duty correction value C2 as a correction value for the second duty D2 is expressed by the equation (5), and the third duty correction value C3 as a correction value for the third duty D3 is expressed by the equation (6).

$$C1 = Dm + Do \quad (4)$$

$$C2 = 0 \quad (5)$$

$$C3 = -(Dm + De) \quad (6)$$

Figure 15:
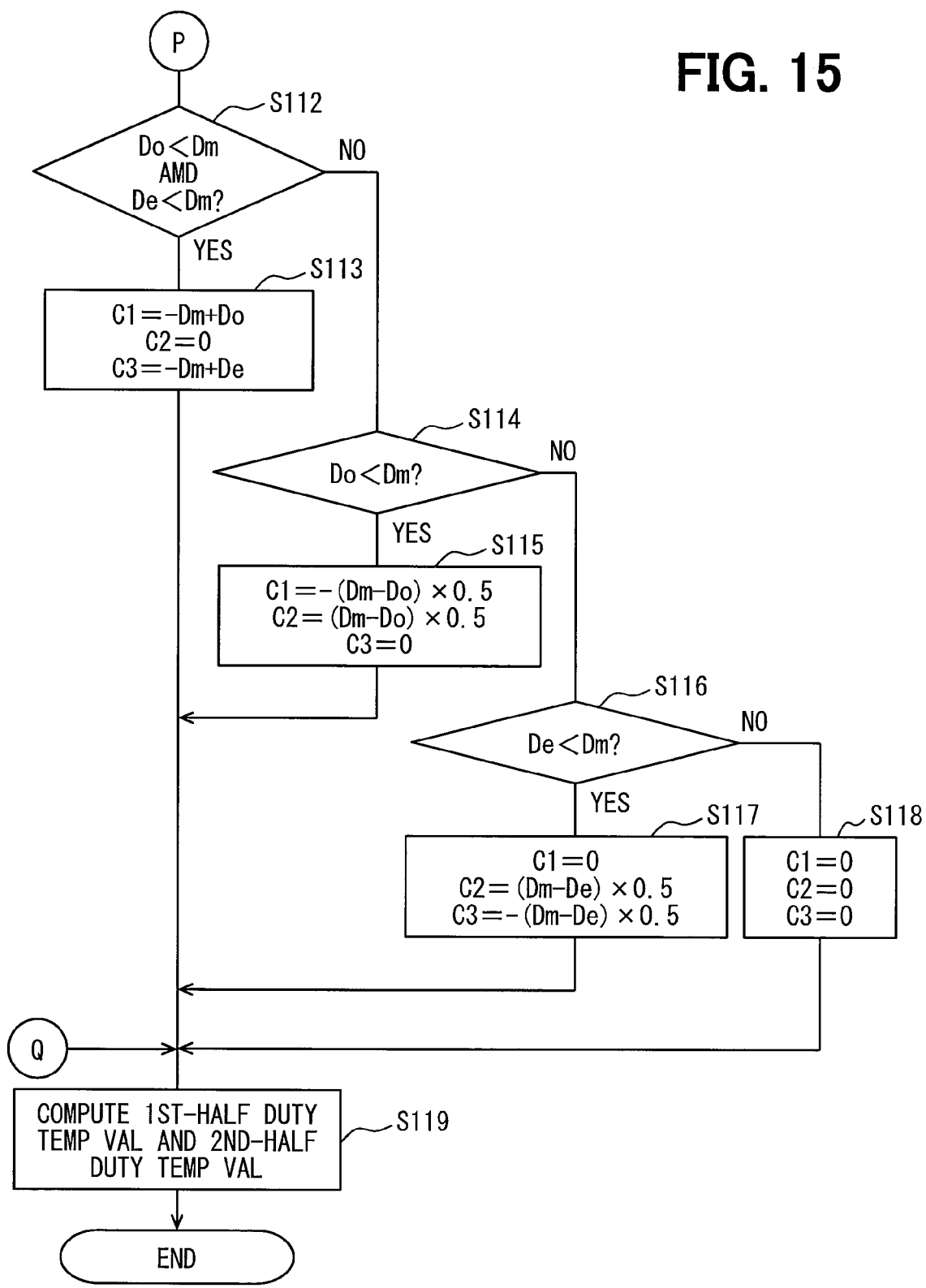
FIG. 15 is a flowchart for explaining the correcting process according to the first embodiment of the disclosure.

After the process of S104, the routine shifts to S119 in FIG. 15.

In the case of making determination of the magnitude relations of the duty conversion values Du_r, Dv_r, and Dw_r in S101 have hysteresis, the magnitude relations determined in S101 may not coincide with actual magnitude relations. In such a case, a value obtained by adding the odd-numbered voltage duty Do to the current detection duty lower-limit value Dm and a value obtained by subtracting the odd-numbered voltage duty Do from the current detection duty lower-limit value Dm are compared with each other, and the larger value may be used as the first duty correction value C1. Similarly, a value obtained by adding the even-numbered voltage duty De to the current detection duty lower-limit value Dm and a value obtained by subtracting the even-numbered voltage duty De from the current detection duty lower-limit value Dm are compared with each other, and a value obtained by multiplying the larger value with −1 may be used as the third duty correction value C3.

Whether or not the amplitude of the voltage instruction values Vu*, Vv*, and Vw* is less than the second predetermined value THa2 which is larger than the first predetermined value THa1 is determined. In S105 to which the routine shifts when it is determined that the amplitude of the voltage instruction values Vu*, Vv*, and Vw* is less than the second predetermined value THa2 (YES in S103), the first duty correction value C1 is set to zero. That is, the correction value C1 for the first duty D1 is expressed by the equation (7).

$$C1 = 0 \quad (7)$$

In S106, whether or not the odd-numbered voltage duty Do is less than a value obtained by subtracting the odd-numbered voltage duty Do from the current detection duty lower-limit value Dm is determined. In the case where it is determined that the odd-numbered voltage duty Do is less than the value obtained by subtracting the odd-numbered voltage duty Do from the current detection duty lower-limit value Dm (YES in S106), the routine shifts to S107. In the case where it is determined that the odd-numbered voltage duty Do is equal to or larger than the value obtained by subtracting the odd-numbered voltage duty Do from the current detection duty lower-limit value Dm (NO in S106), the routine shifts to S108.

In S107, the second duty correction value C2 is obtained by the equation (8-1).

$$C2 = Dm - Do \quad (8\text{-}1)$$

In S108, the second duty correction value C2 is set to the odd-numbered voltage duty Do (equation (8-2)).

$$C2 = Do \quad (8\text{-}2)$$

In the embodiment, the odd-numbered voltage duty Do and the value obtained by subtracting the odd-numbered voltage duty Do from the current detection duty lower-limit value Dm are compared, and the larger value is set as the second duty correction value C2.

In S109 following S107 or S108, whether the active voltage duty Da is less than a value obtained by subtracting the active voltage duty Da from the current detection duty lower-limit value Dm or not is determined. In the case where it is determined that the active voltage duty Da is less than the value obtained by subtracting the active voltage duty Da from the current detection duty lower-limit value Dm (YES in S109), the routine shifts to S110. In the case where it is determined that the active voltage duty Da is equal to or larger than the value obtained by subtracting the active voltage duty Da from the current detection duty lower-limit value Dm (NO in S109), the routine shifts to S111.

In S110, a third duty correction value C3 is obtained by the equation (9-1).

$$C3 = -(Dm - Da) \quad (9\text{-}1)$$

In S111, the third duty correction value C3 is obtained by the equation (9-2).

$$C3 = -Da \quad (9\text{-}2)$$

In the embodiment, the active voltage duty Da and the value obtained by subtracting the active voltage duty Da from the current detection duty lower-limit value Dm are compared, and a value obtained by multiplying the larger value with −1 is set as the third duty correction value C3.

After the process in S110 or S111, the routine shifts to S119 in FIG. 15.

In S112 in FIG. 15 to which the routine shifts in the case where it is determined that the amplitude of the voltage instruction values Vu*, Vv*, and Vw* is equal to or larger than the second predetermined value THa2 (NO in S103), whether both of the odd-numbered voltage duty Do and the even-numbered voltage duty De are less than the current detection duty lower-limit value Dm or not is determined. In the case where it is determined that at least one of the odd-numbered voltage duty Do and the even-numbered voltage duty De is equal to or larger than the current detection duty lower-limit value Dm (NO in S112), the routine shifts to S114. In the case where both of the odd-numbered voltage duty Do and the even-numbered voltage duty De are less than the current detection duty lower-limit value Dm (YES in S112), the routine shifts to S113.

In S113, the first duty correction value C1 is set by the equation (10), the second duty correction value C2 is set by the equation (11), and the third duty correction value C3 is set by the equation (12).

$$C1=-Dm+Do \quad (10)$$

$$C2=0 \quad (11)$$

$$C3=-Dm+De \quad (12)$$

In S114 to which the routine shifts in the case where it is determined that the odd-numbered voltage duty Do or the even-numbered voltage duty De is equal to or larger than the current detection duty lower-limit value Dm (NO in S112), whether the odd-numbered voltage duty Do is less than the current detection duty lower-limit value Dm or not is determined. In the case where it is determined that the odd-numbered voltage duty Do is equal to or larger than the current detection duty lower-limit value Dm (NO in S114), the routine shifts to S116. In the case where it is determined that the odd-numbered voltage duty Do is less than the current detection duty lower-limit value Dm (YES in S114), the routine shifts to S115.

In S115, the first duty correction value C1 is expressed by the equation (13), the second duty correction value C2 is expressed by the equation (14), and the third duty correction value C3 is expressed by the equation (15).

$$C1=-(Dm-Do)\times 0.5 \quad (13)$$

$$C2=(Dm-Do)\times 0.5 \quad (14)$$

$$C3=0 \quad (15)$$

In S116 to which the routine shifts in the case where it is determined that the odd-numbered voltage duty Do is equal to or larger than the current detection duty lower-limit value Dm (NO in S114), whether the even-numbered voltage duty De is less than the current detection duty lower-limit value Dm or not is determined. In the case where it is determined that the even-numbered voltage duty De is equal to or larger than the current detection duty lower-limit value Dm (NO in S116), the routine shifts to S118. In the case where it is determined that the even-numbered voltage duty De is less than the current detection duty lower-limit value Dm (YES in S116), the routine shifts to S117.

In S117, the first duty correction value C1 is set by the equation (16), the second duty correction value C2 is set by the equation (17), and the third duty correction value C3 is expressed by the equation (18).

$$C1=0 \quad (16)$$

$$C2=(Dm-De)\times 0.5 \quad (17)$$

$$C3=-(Dm-De)\times 0.5 \quad (18)$$

In S118 to which the routine shifts in the case where both the odd-numbered voltage duty Do and the even-numbered voltage duty De are equal to or larger than the current detection duty lower-limit value Dm (NO in S114 and NO in S116), the first duty correction value C1, the second duty correction value C2, and the third duty correction value C3 are set to zero (equation (19)).

$$C1=C2=C3=0 \quad (19)$$

Figure 14:
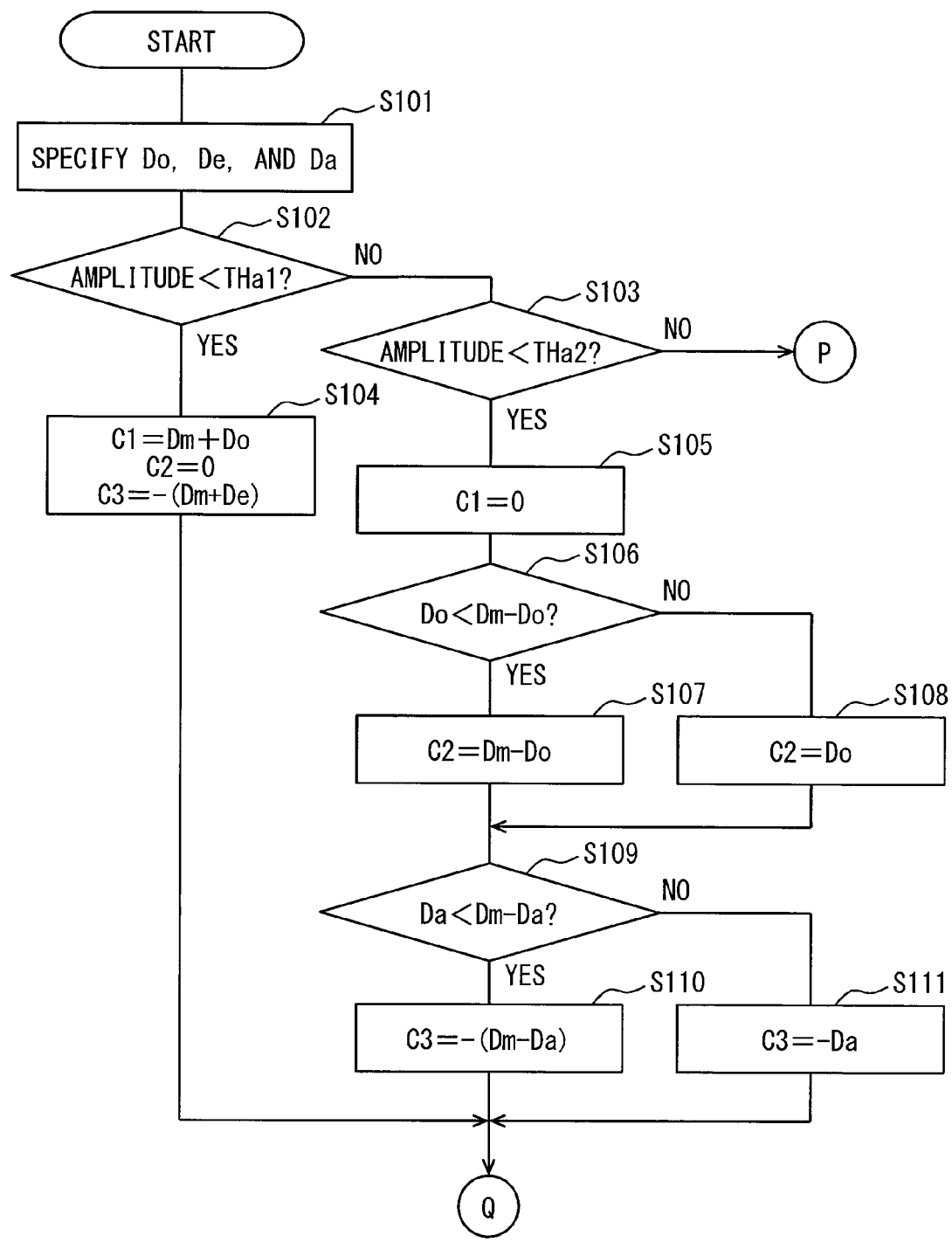
FIG. 14 is a flowchart for explaining a correcting process according to the first embodiment of the disclosure.

In S119 following S104, S110 or S111 in FIG. 13 or S113, S115, S117, or S118 in FIG. 14, on the basis of the first duty correction value C1, the second duty correction value C2, and the third duty correction value C3, the first, second, and third duties D1, D2, and D3 are corrected to compute first-half duty temporary values D1_at, D2_at, and D3_at (equations (20), (21), and (22)) and second-half duty temporary values D1_bt, D2_bt, and D3_bt (equations (23), (24), and (25)).

$$D1\_at=D1+C1 \quad (20)$$

$$D2\_at=D2+C2 \quad (21)$$

$$D3\_at=D3+C3 \quad (22)$$

$$D1\_bt=D1-C1 \quad (23)$$

$$D2\_bt=D2-C2 \quad (24)$$

$$D3\_bt=D3-C3 \quad (25)$$

For example, when the duty conversion values Du_r, Dv_r, and Dw_r satisfy the relation Du_r>Dv_r>Dw_r, the first-half duty temporary values Du_at, Dv_at, and Dw_at and the second-half duty temporary values Du_bt, Dv_bt, and Dw_bt are expressed as equations (26) to (31), respectively.

$$Du\_at=Du\_r+C1 \quad (26)$$

$$Dv\_at=Dv\_r+C2 \quad (27)$$

$$Dw\_at=Dw\_r+C3 \quad (28)$$

$$Du\_bt=Du\_r-C1 \quad (29)$$

$$Dv\_bt=Dv\_r-C2 \quad (30)$$

$$Dw\_bt=Dw\_r-C3 \quad (31)$$

By the above, the active voltage vector interval for performing current detection becomes equal to or longer than the predetermined period. In the embodiment, the correction values C11 to C13 are added in the first-half period and the correction values C11 to C13 are subtracted in the second-half period, so that the correction values are cancelled out in one PWM cycle.

In the embodiment, in the case where the amplitude of the voltage instruction values Vu*, Vv*, and Vw* is less than the first predetermined value THa1, the first duty correction value C1 is set to the value obtained by adding the odd-numbered voltage duty Do to the current detection duty lower-limit value Dm (refer to Equation (4)), and the second duty correction value C2 is set to zero (refer to Equation (5)). Consequently, each of the difference between the first-half duty temporary value D1_a1 related to the first duty D1 and the first-half duty temporary value D2_at related to the second duty D2 and the difference between the second-half duty temporary value D1_bt related to the first duty D1 and the second-half duty temporary value D2_bt related to the second duty D2 is equal to or larger than the current detection duty lower-limit value Dm.

In the case where the amplitude of the voltage instruction values Vu*, Vv*, and Vw* is less than the first predetermined value THa1, the third duty correction value C3 is set to the value obtained by adding the even-numbered voltage duty De to the current detection duty lower-limit value Dm (refer to Equation (6)), and the second duty correction value C2 is set to zero (refer to Equation (5)). Consequently, each of the difference between the first-half duty temporary value D3_at related to the third duty D3 and the first-half duty temporary value D2_at related to the second duty D2 and the difference between the second-half duty temporary value D3_bt related to the third duty D3 and the second-half duty temporary value D2_bt related to the second duty D2 is equal to or larger than the current detection duty lower-limit value Dm.

Next, an adjusting process in the current detection timing adjustment computing unit 74 will be described.

In the embodiment, the timing at which the active voltage vector is generated by the current detection timing adjustment computing unit 74 is adjusted so that timings of detecting the current detection value Ic by the AD converter 42 become at predetermined intervals. It is assumed that the timing of detecting the current detection value Ic by the AD converter 42 lies in the active voltage vector interval and is a timing after time for converging ringing elapses.

The AD converter 42 samples the voltage between both ends of the shunt resistor 40 four times at predetermined intervals in one PWM cycle. The sampling timings in the AD converter 42 include timings after the center (lower and upper ends) of the PWM reference signal P by detection shift time t1 (for example, a few μs) and a timing which is intermediate of the timings. The first sampling timing in one PWM cycle is set as t11, the second sampling timing is set as t12, the third sampling timing is set as t13, and the fourth sampling timing is set as t14.

The current detection timing adjustment computing unit 74 adjusts the timing at which an active voltage vector for performing current detection is generated by changing the neutral voltage as an average value of voltages applied to the coils 11 to 13 so that at least one of t11 and t12 and at least one of t13 and t14 become timings after lapse of the time for converging ringing in the active voltage vector interval. Even when the neutral voltage is changed, the line voltage applied to the coils 11, 12, and 13 does not change.

The adjusting process in the current detection timing adjustment computing unit 74 will be described with reference to the flowchart illustrated in FIG. 16.

Figure 16:
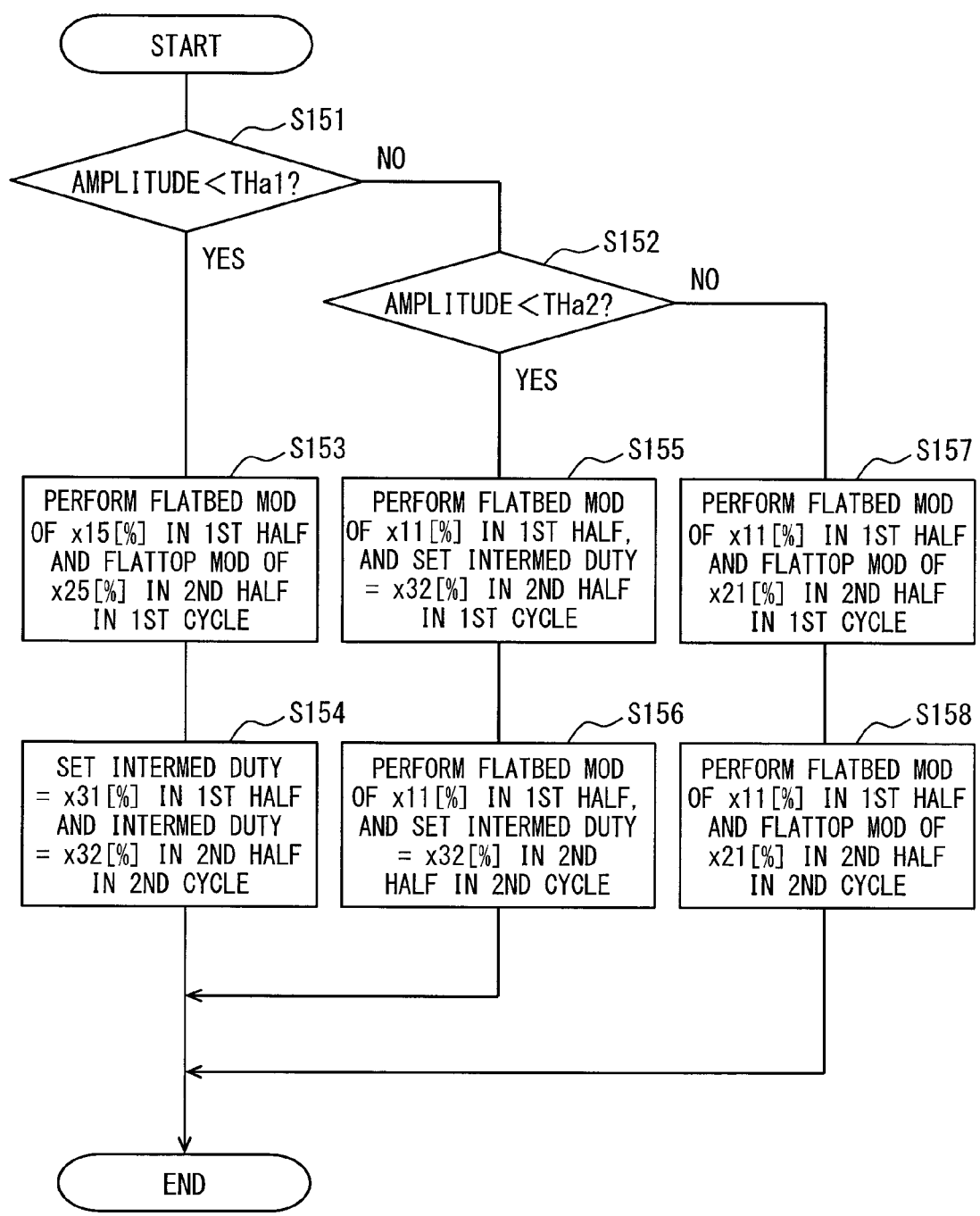
FIG. 16 is a flowchart for explaining an adjusting process according to the first embodiment of the disclosure.

In the adjusting process illustrated in FIG. 16, duty instruction values of two PWM cycles are computed by a single process.

In S151, whether the amplitude of the voltage instruction values Vu*, Vv*, and Vw* is less than the first predetermined value THa1 or not is determined. This process is similar to the process of S102 in FIG. 14. In the case where it is determined that the amplitude of the voltage instruction values Vu*, Vv*, and Vw* is less than the first predetermined value THa1 (YES in S151), the routine shifts to S153. In the case where it is determined that the amplitude of the voltage instruction values Vu*, Vv*, and Vw* is equal to or larger than the first predetermined value THa1 (NO in S151), the routine shifts to S152.

In S152, whether the amplitude of the voltage instruction values Vu*, Vv*, and Vw* is less than the second predetermined value THa2 or not is determined. This process is similar to the process of S103 in FIG. 13. In the case where it is determined that the amplitude of the voltage instruction values Vu*, Vv*, and Vw* is less than the second predetermined value THa2 (YES in S152), the routine shifts to S155. In the case where it is determined that the amplitude of the voltage instruction values Vu*, Vv*, and Vw* is equal to or larger than the second predetermined value THa2 (NO in S152), the routine shifts to S157.

In S153 to which the routine shifts in the case where it is determined that the amplitude of the voltage instruction values Vu*, Vv*, and Vw* is less than the first predetermined value THa1 (YES in S151), in the first-half period of the first cycle, modulation is performed so that the duty of the smallest phase becomes the lower-side duty setting value x15. Hereinafter, the modulating method of performing modulation so that the duty of the smallest phase becomes a predetermined value will be called "flatbed modulation". In the second-half period of the first cycle, modulation is performed so that the duty of the largest phase becomes an upper-side duty setting value x25. Hereinafter, the modulating method of performing modulation so that the duty of the largest phase becomes a predetermined value will be called "flattop modulation". In the embodiment, the lower-side duty setting value x15 is set by the equation (32), and the upper-side duty setting value x25 is set by the equation (33). Each of xd1 and xd2 in the equations is a shift amount from the center value of the duty and is set according to a current detection timing. In the embodiment, xd1=xd2=4[%] is satisfied.

$$x15[\%]=50+xd1 \tag{32}$$

$$x25[\%]=50-xd2 \tag{33}$$

For example, in the first-half period of the first cycle, when the first-half duty temporary values Du_at, Dv_at, and Dw_at satisfy the relation of Du_at>Dv_at>Dw_at and the flatbed modulation of 54% is performed, the first-half duty instruction values Du_a1, Dv_a1, and Dw_a1 in the first cycle are expressed by equations (34), (35), and (36), respectively.

$$Du\_a1[\%]=Du\_at-Dw\_at+54 \tag{34}$$

$$Dv\_a1[\%]=Dv\_at-Dw\_at+54 \tag{35}$$

$$Dw\_a1[\%]=Dw\_at-Dw\_at+54 \tag{36}$$

In the second-half period of the first cycle, when the second-half duty temporary values Du_bt, Dv_bt, and Dw_bt satisfy the relation of Du_bt>Dv_bt>Dw_bt and the flattop modulation of 46% is performed, the second-half duty instruction values Du_b1, Dv_b1, and Dw_b1 in the first cycle are expressed by equations (37), (38), and (39), respectively.

$$Du\_b1[\%]=Du\_bt-Du\_bt+46 \tag{37}$$

$$Dv\_b1[\%]=Dv\_bt-Du\_bt+46 \tag{38}$$

$$Dw\_b1[\%]=Dw\_bt-Du\_bt+46 \tag{39}$$

In S154, in the first-half period of the second cycle, modulation is performed so that the duty in the middle (written as "middle duty" in the diagram) becomes an intermediate duty setting value x31. In the second-half period of the second cycle, modulation is performed so that the duty in the middle becomes an intermediate duty setting value x32. In the embodiment, the intermediate duty setting values x31 and x32 are expressed by equations (37) and (38), respectively. Each of xd3 and xd4 in the equations is a shift amount from the center value of the duty and is set according to a current detection timing. In the embodiment, xd3=xd4=4[%] is set. Although xd1=xd2=xd3=xd4=4[%] is set in the embodiment, the shift amounts xd1 to xd4 can be properly set.

$$x31=50+xd3 \quad (37)$$

$$x32=50-xd4 \quad (38)$$

For example, in the first-half period of the second cycle, when the first-half duty temporary values Du_at, Dv_at, and Dw_at satisfy the relation of Du_at>Dv_at>Dw_at and the intermediate duty setting value is set to 54%, the first-half duty instruction values Du_a2, Dv_a2, and Dw_a2 in the second cycle are expressed by equations (39), (40), and (41), respectively.

$$Du\_a2[\%]=Du\_at-Dv\_at+54 \quad (39)$$

$$Dv\_a2[\%]=Dv\_at-Dv\_at+54 \quad (40)$$

$$Dw\_a2[\%]=Dw\_at-Dv\_at+54 \quad (41)$$

In the second-half period of the second cycle, when the second-half duty temporary values Du_bt, Dv_bt, and Dw_bt satisfy the relation of Du_bt>Dv_bt>Dw_bt and the intermediate duty setting value is set to 46%, the second-half duty instruction values Du_b2, Dv_b2, and Dw_b2 in the second cycle are expressed by equations (42), (43), and (44), respectively.

$$Du\_b2[\%]=Du\_bt-Dv\_bt+46 \quad (42)$$

$$Dv\_b2[\%]=Dv\_bt-Dv\_bt+46 \quad (43)$$

$$Dw\_b2[\%]=Dw\_bt-Dv\_bt+46 \quad (44)$$

In S153 and S154, the modulation is performed so that the amplitude of the voltage instruction values Vu*, Vv*, and Vw* is smaller than the first predetermined value THa1 and the duty of each of the phases becomes around 50%, a zero voltage vector period of a predetermined period or longer is assured at the upper and lower ends of the PWM reference signal P.

In S155 to which the routine shifts in the case where it is determined that the amplitude of the voltage instruction values Vu*, Vv*, and Vw* is equal to or larger than the first predetermined value THa1 (NO in S151) and is less than the second predetermined value THa2 (YES in S152), in the first-half period of the first cycle, the flatbed modulation is performed so that the duty of the smallest phase becomes the duty lower-limit value x11. In the second-half period of the first cycle, modulation is performed so that the duty in the middle becomes the intermediate duty setting value x32.

The duty lower-limit value x11 is a value according to the dead time. In the embodiment, the duty lower-limit value x11 is set to 4%. By the operation, the voltage vector period V7 as the zero voltage vector period can be assured in a predetermined period including the lower end of the PWM reference signal P.

For example, in the first-half period of the first cycle, when the first-half duty temporary values Du_at, Dv_at, and Dw_at satisfy the relation of Du_at>Dv_at>Dw_at and the flatbed modulation of 4% is performed, the first-half duty instruction values Du_a1, Dv_a1, and Dw_a1 in the first cycle are expressed by equations (45), (46), and (47), respectively.

$$Du\_a1[\%]=Du\_at-Dw\_at+4 \quad (45)$$

$$Dv\_a1[\%]=Dv\_at-Dw\_at+4 \quad (46)$$

$$Dw\_a1[\%]=Dw\_at-Dw\_at+4 \quad (47)$$

In the second-half period of the first cycle, when the second-half duty temporary values Du_bt, Dv_bt, and Dw_bt satisfy the relation of Du_bt>Dv_bt>Dw_bt and the intermediate duty setting value is 46%, the second-half duty instruction values Du_b1, Dv_b1, and Dw_b1 in the first cycle are expressed by equations (48), (49), and (50), respectively.

$$Du\_b1[\%]=Du\_bt-Dv\_bt+46 \quad (48)$$

$$Dv\_b1[\%]=Dv\_bt-Dv\_bt+46 \quad (49)$$

$$Dw\_b1[\%]=Dw\_bt-Dv\_bt+46 \quad (50)$$

In S156, like in the first cycle, in the first-half period of the second cycle, the flatbed modulation is performed so that the duty of the smallest duty becomes the duty lower-limit value x11. In the second-half period of the second cycle, modulation is performed so that the duty in the middle becomes an intermediate duty setting value x32. That is, the first-half duty instruction values Du_a2, Dv_a2, and Dw_a2 and the second-half duty instruction values Du_b2, Dv_b2, and Dw_b2 of the second cycle are expressed by equations (51) to (56), respectively.

$$Du\_a2=Du\_a1 \quad (51)$$

$$Dv\_a2=Dv\_a1 \quad (52)$$

$$Dw\_a2=Dw\_a1 \quad (53)$$

$$Du\_b2=Du\_b1 \quad (54)$$

$$Dv\_b2=Dv\_b1 \quad (55)$$

$$Dw\_b2=Dw\_b1 \quad (56)$$

In S155 and S156, the amplitude of the voltage instruction values Vu*, Vv*, and Vw* is less than the second predetermined value THa2, the flatbed modulation of 4% is performed in the first-half period, and the modulation is performed so that the duty in the middle becomes around 50% in the second-half period. Consequently, the zero voltage vector period which is equal to or longer than a predetermined period can be assured at the upper and lower ends of the PWM reference signal P.

In S157 to which the routine shifts in the case where it is determined that the amplitude of the voltage instruction values Vu*, Vv*, and Vw* is equal to or larger than the second predetermined value THa2 (NO in S152), in the first-half period of the first cycle, the flatbed modulation is performed so that the duty of the smallest phase becomes the duty lower-limit value x11. In the second-half period of the first cycle, the flattop modulation is performed so that the duty of the largest phase becomes the duty upper-limit value x21. The duty upper-limit value x21 is a value according to the dead time. In the embodiment, the duty upper-limit value x21 is set to 96%. By the operation, the zero voltage vector period can be assured in a predetermined period including the lower end of the PWM reference signal P and a predetermined period including the upper end.

For example, in the second-half period of the first cycle, when the second-half duty temporary values Du_bt, Dv_bt, and Dw_bt satisfy the relation of Du_bt>Dv_bt>Dw_bt and the flattop modulation of 96% is performed, the second-half duty instruction values Du_b1, Dv_b1, and Dw_b1 in the first cycle are expressed by equations (57), (58), and (59), respectively. The first-half duty instruction values Du_a1, Dv_a1, and Dw_a1 of the first cycle are similar to the equations (45), (46), and (47), respectively, in S155.

$$Du\_b1[\%]=Du\_bt-Du\_bt+96 \quad (57)$$

$$Dv\_b1[\%]=Dv\_bt-Du\_bt+96 \quad (58)$$

$$Dw\_b1[\%]=Dw\_bt-Du\_bt+96 \quad (59)$$

In S158, like the first cycle, in the first-half period of the second cycle, the flatbed modulation is performed so that the duty of the smallest duty becomes the duty lower-limit value x11. In the second-half period of the second cycle, the flattop modulation is performed so that the duty of the largest phase becomes the duty upper-limit value x21. That is, the first-half duty instruction values Du_a2, Dv_a2, and Dw_a2 and the second-half duty instruction values Du_b2, Dv_b2, and Dw_b2 of the second cycle are expressed by the equations (51) to (56) like in S156.

That is, in the embodiment, in the case where the amplitude of the voltage instruction values Vu*, Vv*, and Vw* is less than the first predetermined value THa1, by performing adjusting processes which are different between the first cycle as an odd-numbered cycle and the second cycle as an even-numbered cycle, the duty instruction values in the first cycle and those in the second cycle are different. In the case where the amplitude of the voltage instruction values Vu*, Vv*, and Vw* is equal to or larger than the first predetermined value THA1, the duty instruction values in the first cycle and those in the second cycle are equal.

A concrete example of the correcting process and the adjusting process of the embodiment will be described with reference to FIGS. 17A to 17D to FIGS. 19A to 19C.

Figure 18A:
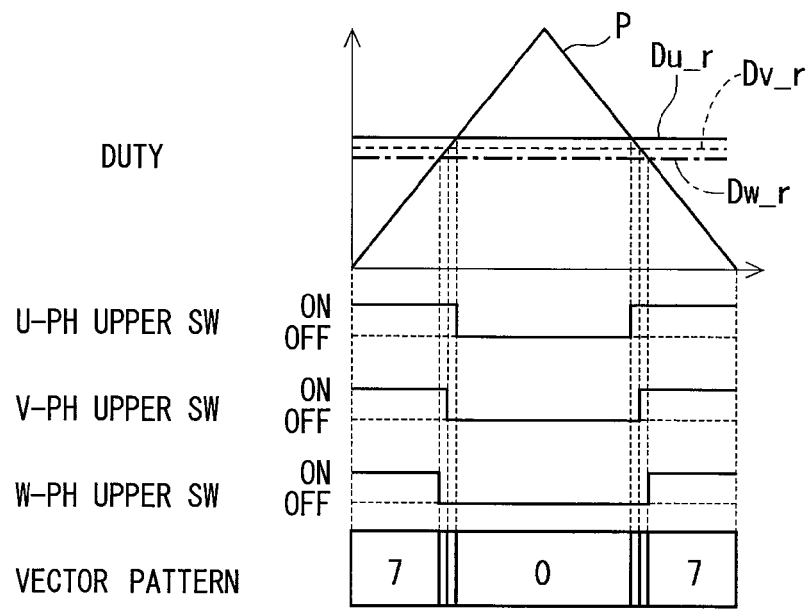
FIGS. 18A to 18C are explanatory diagrams for explaining a correcting process and an adjusting process in the case where the amplitude of the voltage instruction value is equal to or larger than a first predetermined value and is less than a second predetermined value in the first embodiment of the disclosure.
Figure 18B:
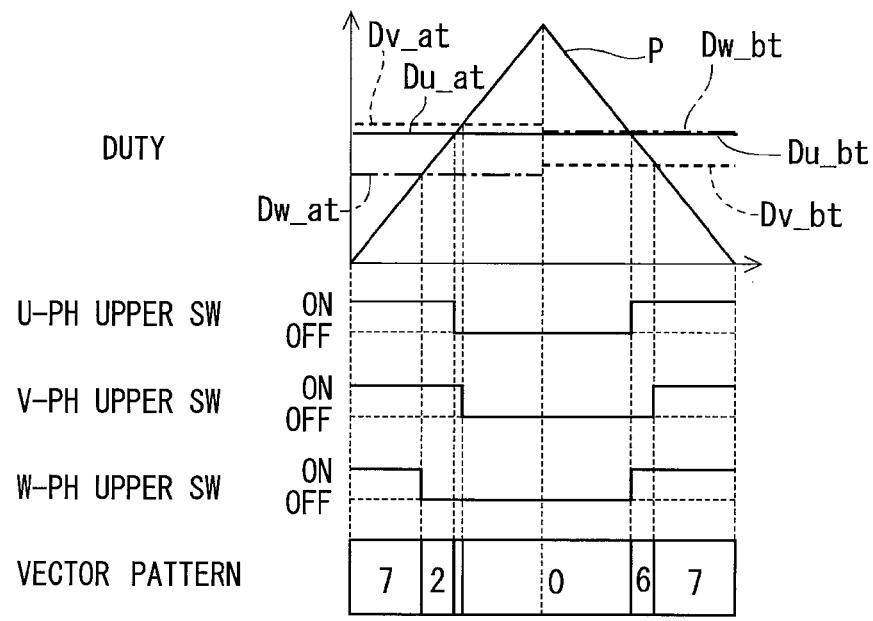
Figure 18C:
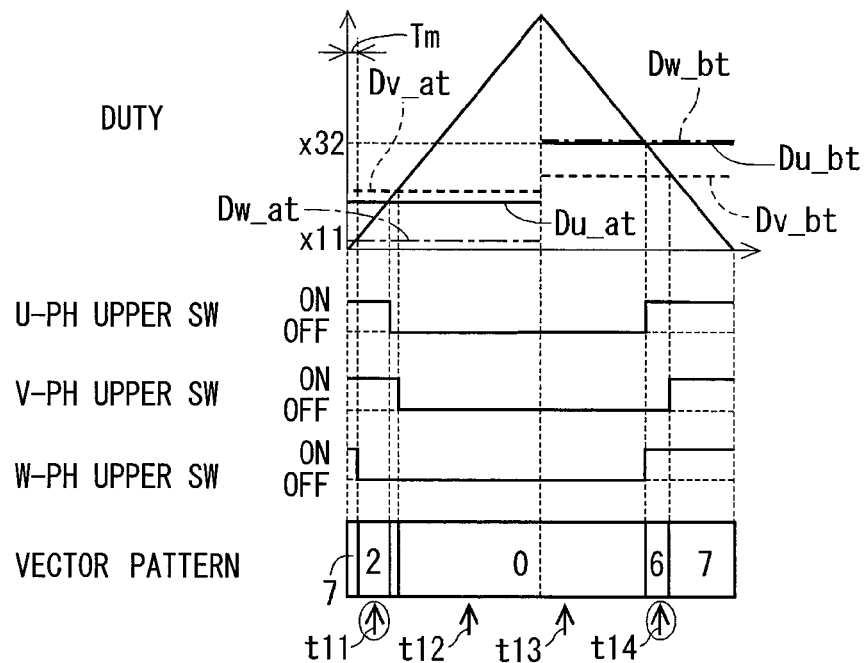
Figure 19A:
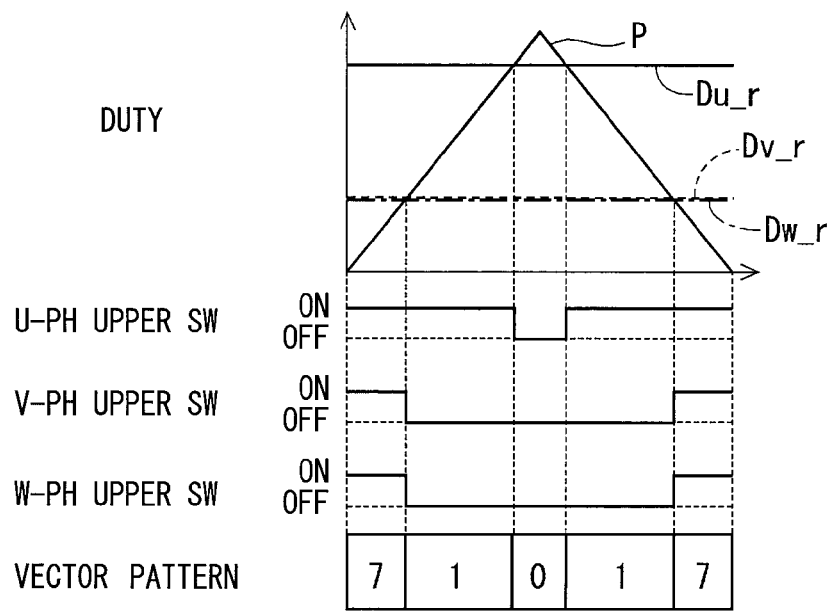
FIGS. 19A to 19C are explanatory diagrams for explaining a correcting process and an adjusting process in the case where the amplitude of the voltage instruction value is equal to or larger than a second predetermined value in the first embodiment of the disclosure.
Figure 19B:
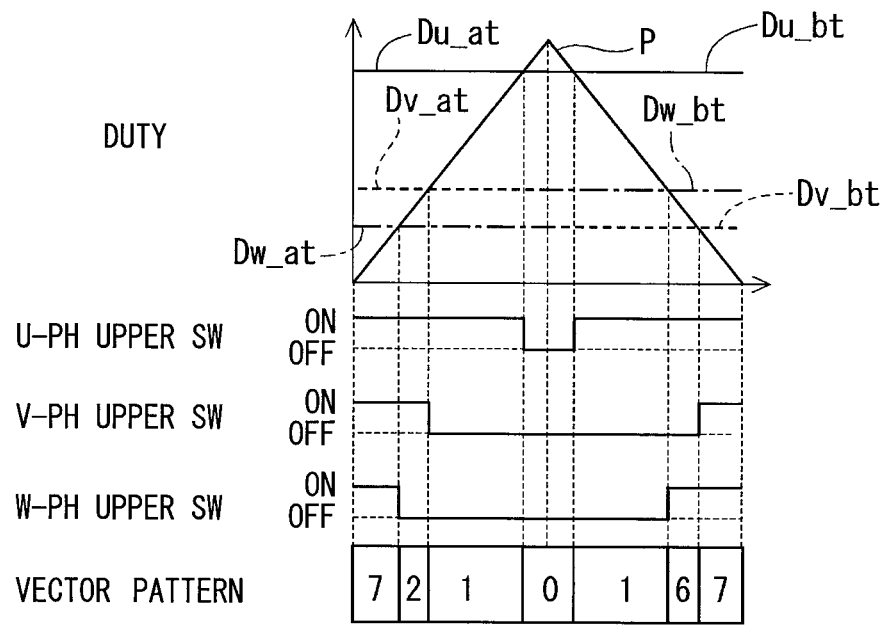
Figure 19C:
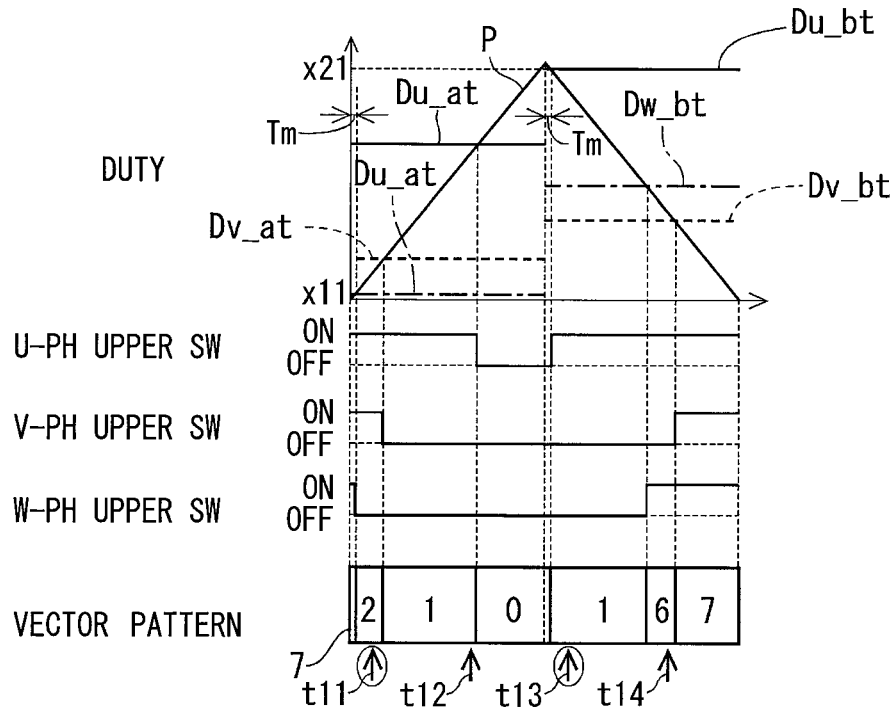

FIGS. 17A to 17D illustrate an example in the case where the amplitude of the voltage instruction values Vu*, Vv*, and Vw* is less than the first predetermined value THa1. FIGS. 18A to 18C illustrate an example in the case where the amplitude of the voltage instruction values Vu*, Vv*, and Vw* is equal to or larger than the first predetermined value THa1 and less than the second predetermined value THa2. FIGS. 19A to 19C illustrate an example of the case where the amplitude of the voltage instruction values Vu*, Vv*, and Vw* is equal to or larger than the second predetermined value THa2. In the following drawings, the on/off operation of the upper SW 21 to 23 will be mainly described. To simplify the description, it is assumed that the PWM reference signal is the PWM reference signal P prior to shift illustrated in FIG. 5 and the range of the duty is 0% to 100%.

In FIGS. 17A to 17D, an example that the duty conversion values Du_r, Dv_r, and Dw_r prior to correction satisfy the relations of Dv_r>Du_r>Dw_r.

Figure 17A:
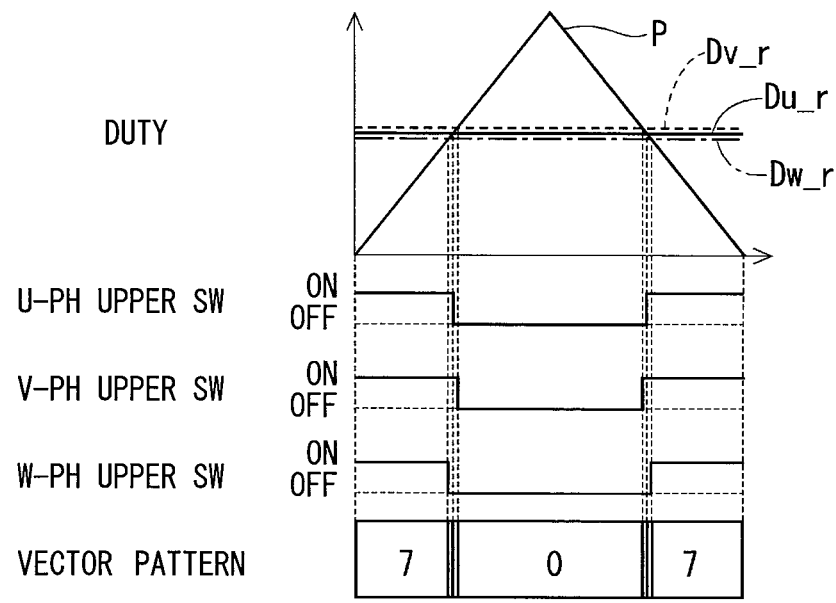
FIGS. 17A to 17D are explanatory diagrams for explaining a correcting process and an adjusting process in the case where the amplitude of a voltage instruction value is less than a first predetermined value in the first embodiment of the disclosure.

As illustrated in FIG. 17A, in the case of controlling the on/off state of the SW 21 to 26 on the basis of the duty conversion values Du_r, Dv_r, and Dw_r prior to correction, the active voltage vector period is short and the currents Iu, Iv, and Iw of respective phases cannot be detected.

Figure 17B:
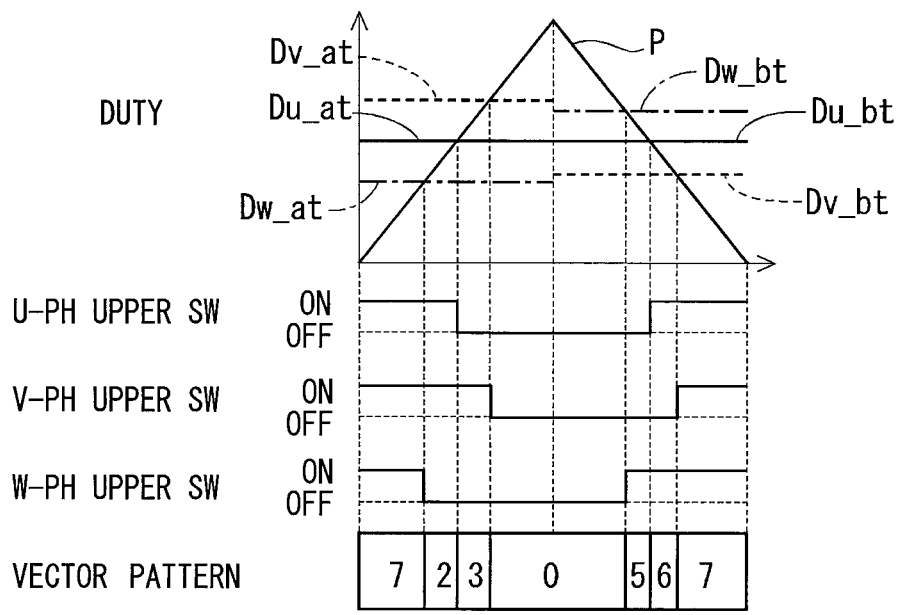

Consequently, in the embodiment, as illustrated in FIG. 17B, to assure the active voltage vector interval in which current can be detected, the duty conversion values Du_r, Dv_r, and Dw_r are corrected. Specifically, the duty of the V phase as a phase in which the duty conversion value is the largest is corrected upward to set the first-half duty temporary value Dv_at of the V phase so that both of the voltage vector period V2 in which current detection is performed in the first-half period of the first cycle and the voltage vector period V3 in which current detection is performed in the first-half period of the second cycle become periods in which current can be detected. The duty of the W phase as the phase of the smallest duty conversion value is corrected downward to set the first-half duty temporary value Dw_at of the W phase.

The duty of the V phase as a phase in which the duty conversion value is the largest is corrected downward to set the second-half duty temporary value Dv_bt of the V phase so that both of the voltage vector period V5 in which current detection is performed in the second-half period of the first cycle and the voltage vector period V6 in which current detection is performed in the second-half period of the second cycle become periods in which current can be detected. The duty of the W phase as the phase of the smallest duty conversion value is corrected upward to set the second-half duty temporary value Dw_bt of the W phase.

In the case where the amplitude of the voltage instruction values Vu*, Vv*, and Vw* is less than the first predetermined value THa1, the duty of the U phase as the phase in which the duty conversion value is in the middle is not corrected. Consequently, the first-half duty temporary value Du_at and the second-half duty temporary value Du_bt of the U phase are equal to the duty conversion value Du_r.

By the above operation, the timing of switching the V upper SW 22 from the on state to the off state and the timing of switching it from the off state to the on state are shifted backward. The timing of switching the W upper SW 23 from the on state to the off state and the timing of switching it from the off state to the on state are shifted forward. At this time, the period in which the V upper SW 22 and the W upper SW 23 are on does not change before and after the correction.

The duties of the V phase and the W phase are corrected so that their magnitudes are equal and the correction directions are opposite between the first-half period and the second-half period. Since a change in the application voltage by the correction in the first-half period and that in the second-half period cancel out each other, in one PWM cycle, there is no change in the application voltage before and after correction.

Figure 17C:
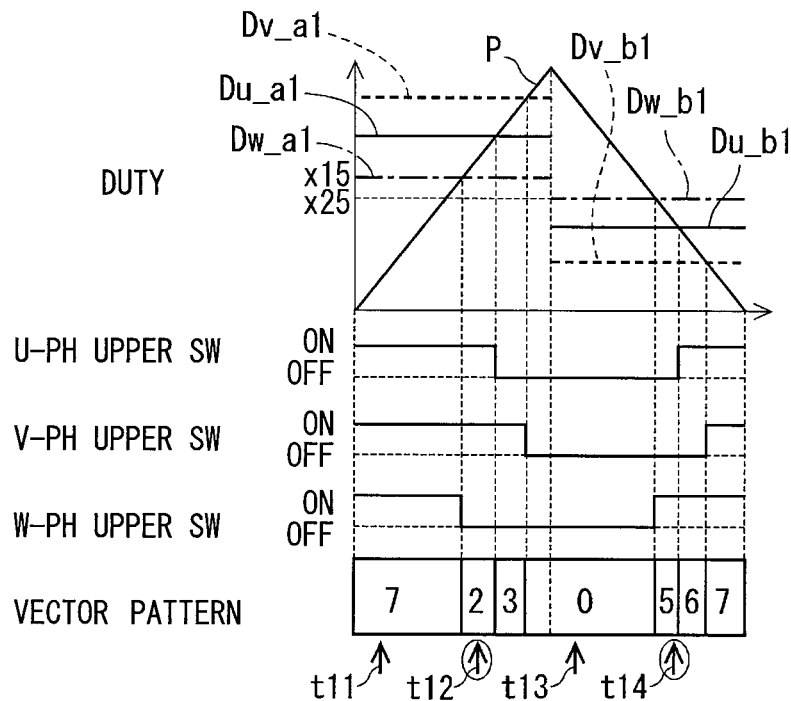
Figure 17D:
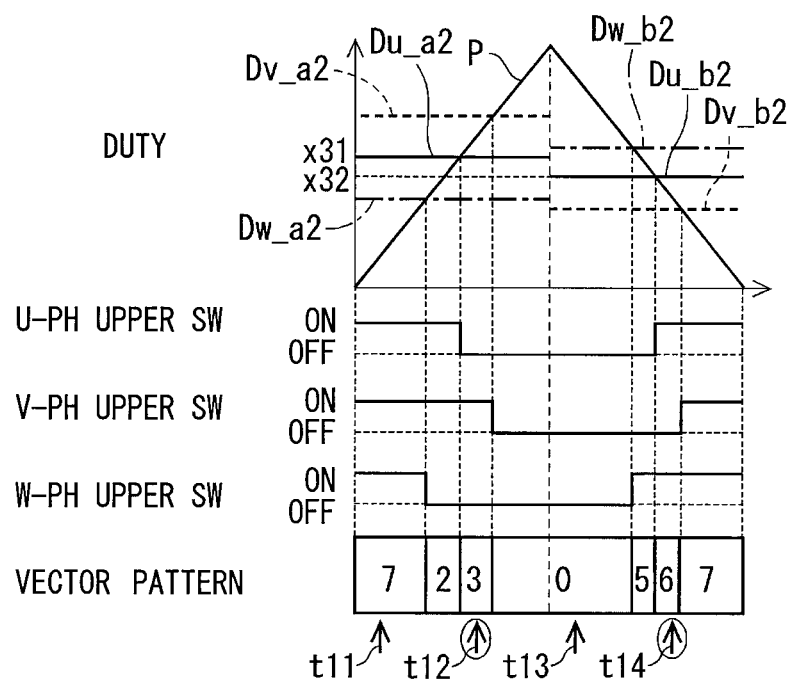

As illustrated in FIGS. 17C and 17D, the adjusting process is performed so that the currents Iu, Iv, and Iw of the respective phases can be computed on the basis of values sampled and held at predetermined sampling timings t11, t12, t13, and t14 by the AD converter 42 regardless of the amplitudes of the voltage instruction values Vu*, Vv*, and Vw*.

Specifically, as illustrated in FIG. 17C, in the first-half period of the first cycle, the flatbed modulation is performed so that the first-half duty instruction value Dw_a1 of the W phase as the smallest duty becomes the lower-side duty setting value x15 (54% in the embodiment). In the second-half period of the first cycle, the flattop modulation is performed so that the second-half duty instruction value Dv_b1 of the W phase as the duty of the largest phase becomes the upper-side duty setting value x25 (46% in the embodiment).

As illustrated in FIG. 17D, in the first-half period of the second cycle, the modulation is performed so that the first-half duty instruction value Du_a2 of the U phase as the duty in the middle becomes the intermediate duty setting value x31 (54% in the embodiment). In the second-half period of the second cycle, the modulation is performed so that the second-half duty instruction value Du_b2 of the U phase as the duty in the middle becomes the intermediate duty setting value x32 (46% in the embodiment). At this time, the voltage vector interval V0 and the voltage vector interval V7 in the first-half period and the second-half period become the minimum time Tm or longer. Here, the voltage vector interval V0 corresponds to a first voltage vector interval, and the voltage vector interval V7 corresponds to a second voltage vector interval.

As described above, the sampling timings in one PWM cycle are t11 to t14, the current detection value sampled at t11 is Ic11, the current detection value sampled at t12 is Ic12, the current detection value sampled at t13 is Ic13, and the current detection value sampled at t14 is Ic14. In FIGS. 17C and 17D and the other drawings, the arrows indicating the sampling timings used for computation of the currents Iu, Iv, and Iw of the respective phases are surrounded by circles.

As illustrated in FIG. 17C, the current detection value Ic12 detected at the first sampling timing t12 in the first cycle is a value detected in the voltage vector interval V2 and is a value when the duty of the W phase is corrected to the negative side. The current detection value Ic14 detected at the fourth sampling timing t14 is a value detected in the voltage vector interval V5 and is a value when the duty of the W phase is corrected to the positive side. In the embodiment, on the basis of the current detection value Ic12 when the duty of the W phase is corrected to the negative side and the current detection value Ic14 when the duty is corrected to the positive side, the phase current computing unit 61 computes the W-phase current Iw.

As illustrated in FIG. 17D, the current detection value Ic12 detected at the second sampling timing t12 in the second cycle is a value detected in the voltage vector interval V3 and is a value when the duty of the V phase is corrected to the positive side. The current detection value Ic14 detected at the fourth sampling timing t14 is a value detected in the voltage vector interval V6 and is a value when the duty of the V phase is corrected to the lower side. In the embodiment, on the basis of the current detection value Ic12 when the duty of the V phase is corrected to the positive side and the current detection value Ic14 when the duty is corrected to the negative side, the phase current computing unit 61 computes the V-phase current Iv.

In the embodiment, in the case where the amplitude of the current instruction values Vu*, Vv*, and Vw* is less than the first predetermined value THa1, using a current detection value when the duty is corrected to the positive side and a current detection value when the duty is corrected to the negative side, the phase current computing unit 61 performs a ripple correcting process on the currents Iu, Iv, and Iw of the respective phases. The details of the ripple correcting process will be described later.

The current detection value Ic11 detected at the first sampling timing t11 and the current detection value Ic13 detected at the third sampling timing t13 are used for offset correction.

FIGS. 18A to 18C illustrate an example in which the amplitude of the voltage instruction values Vu*, Vv*, and Vw* is equal to or larger than the first predetermined value THa1 and is less than the second predetermined value THa2, and the duty conversion values Du_r, Dv_r, and Dw_r prior to the correction satisfy the relation of Du_r>Dv_r>Dw_r.

As illustrated in FIG. 18A, in the case where the amplitude of the voltage instruction values Vu*, Vv*, and Vw* is equal to or larger than the first predetermined value THa1 and is less than the second predetermined value THa2, when the on/off state of the SW 21 to 26 is controlled on the basis of the duty conversion values Du_r, Dv_r, and Dw_r prior to correction, the active voltage vector period is short and the currents Iu, Iv, and Iw of respective phases cannot be detected.

Consequently, in the embodiment, as illustrated in FIG. 18B, to assure the active voltage vector interval in which current can be detected, the duty conversion values Du_r, Dv_r, and Dw_r are corrected. Specifically, in the first-half period, the duty of the W phase as a phase in which the duty conversion value is the smallest is corrected downward to set the first-half duty temporary value Dw_at of the W phase so that the voltage vector V2 for performing current detection becomes equal to or longer than a period in which current can be detected. At this time, the duty of the V phase is corrected upward so that the voltage vector interval V2 for performing current detection does not become shorter and the first-half duty temporary value Dv_at of the V phase becomes larger than the first-half duty temporary value Du_at of the U phase.

In the second-half period, the duty of the V phase in which the duty conversion value is in the middle is corrected downward to set the second-half duty temporary value Dv_bt so that the voltage vector V6 for performing current detection becomes equal to or longer than a period in which current can be detected. At this time, the duty conversion value Dw_r is corrected upward so that the voltage vector interval V6 for performing current detection does not become shorter and the second-half duty temporary value Dw_bt of the W phase becomes larger than the second-half duty temporary value Du_bt of the U phase.

In the case where the amplitude of the voltage instruction values Vu*, Vv*, and Vw* is equal to or larger than the first predetermined value THa1 and is less than the second predetermined value THa2, the duty of the U phase as the phase of the largest duty conversion value is not corrected. Consequently, the first-half duty temporary value Du_at of the U phase and the second-half duty temporary value Du_bt are equal to the duty conversion value Du_r.

By the above operation, the timing of switching the V upper SW 22 from the on state to the off state and the timing of switching it from the off state to the on state are shifted backward. The timing of switching the W upper SW 23 from the on state to the off state and the timing of switching it from the off state to the on state are shifted forward. At this time, the period in which the V upper SW 22 and the W upper SW 23 are on does not change before and after the correction.

The duties of the V phase and the W phase are corrected so that their magnitudes are equal and the correction directions are opposite between the first-half period and the second-half period. Since a change in the application voltage by the correction in the first-half period and that in the second-half period cancel out each other, in one PWM cycle, there is no change in the application voltage before and after correction.

As illustrated in FIG. 18C, the adjusting process is performed so that the currents Iu, Iv, and Iw of the respective phases can be computed on the basis of values sampled and held at the sampling timings t11, t12, t13, and t14 of the predetermined intervals by the AD converter 42 regardless of the amplitudes of the voltage instruction values Vu*, Vv*, and Vw*. Specifically, in the first-half period, the flatbed modulation is performed so that the first-half duty instruction value Dw_a of the W phase as the smallest duty becomes the duty lower-limit value x11. In the second-half period, the flatbed modulation is performed so that the second-half duty instruction value Dv_b of the V phase as the duty of the smallest phase becomes the lower-side duty setting value x12. By the operation, the voltage vector interval V7 in the first-half period becomes the minimum time Tm. The voltage vector interval V0 in the first-half period and the voltage vector intervals V0 and V7 in the second-half period become the minimum time Tm or longer.

In FIG. 18C, the current detection value Ic11 detected at the first sampling timing t11 is a value detected in the voltage vector interval V2, so that the W-phase current Iw is computed on the basis of the current detection value Ic11 in the phase current computing unit 61. Since the current detection value Ic14 detected at the fourth sampling timing t14 is a value detected in the voltage vector interval V6, the V-phase current Iv is computed on the basis of the current detection value Ic14 in the phase current computing unit 61. The U-phase current Iu is computed on the basis of the V-phase current Iv and the W-phase current Iw.

The current detection value Ic12 detected at the second sampling timing t12 and the current detection value Ic13 detected at the third sampling timing t13 are used for offset correction.

FIGS. 19A to 19C illustrate an example in which the amplitude of the voltage instruction values Vu*, Vv*, and Vw* is equal to or larger than the second predetermined value THa2, the U-phase duty conversion value Du_r is the largest, the duty conversion value Dv_r of the V phase and the duty conversion value Dw_r of the W phase are almost equal, and the even-number voltage duty De is equal to or less than the current detection duty lower-limit value Dm. In this case, Dv_r>Dw_r is satisfied.

As illustrated in FIG. 19A, in the case of controlling the on/off state of the SW 21 to 26 on the basis of the duty conversion values Du_r, Dv_r, and Dw_r prior to correction, although the U-phase current Iu can be detected in the voltage vector interval V1, the V-phase current Iv and the W-phase current Iw cannot be detected.

In the embodiment, therefore, as illustrated in FIG. 19B, to assure the active voltage vector interval in which current can be detected, the duty conversion values Du_r, Dv_r, and Dw_r are corrected. Specifically, in the first-half period, the duty of the V phase in which the duty conversion value is in the middle is corrected upward to become the first-half duty temporary value Dv_at of the V phase and the duty of the W phase as a phase of the smallest duty conversion value is corrected downward to the first-half duty temporary value Dw_at of the W phase so that the period becomes a period in which the voltage vector V2 for current detection can detect current.

In the second-half period, to cancel out the correction amounts of the second-half period, the duty of the V phase is corrected downward to the second-half duty temporary value Dv_bt of the V phase. The duty of the W phase is corrected upward to the second-half duty temporary value Dw_bt of the W phase.

In the example, the duty of the U phase of the largest duty conversion value is not corrected. Consequently, the first-half duty conversion value Du_at and the second-half duty conversion value Du_bt of the U phase are equal to the duty conversion value Du_r.

By the above operation, the timing of switching the V upper SW 22 from the on state to the off state and the timing of switching it from the off state to the on state are shifted backward. The timing of switching the W upper SW 23 from the on state to the off state and the timing of switching it from the off state to the on state are shifted forward. At this time, the period in which the V upper SW 22 and the W upper SW 23 are on does not change before and after the correction.

The duties of the V phase and the W phase are corrected so that their magnitude are equal and the correction directions are opposite between the first-half period and the second-half period. Since a change in the application voltage by the correction in the first-half period and that in the second-half period cancel out each other, in one PWM cycle, there is no change in the application voltage before and after correction.

As illustrated in FIG. 19C, the adjusting process is performed so that the currents Iu, Iv, and Iw of the respective phases can be computed on the basis of values sampled and held at the sampling timings t11, t12, t13, and t14 at predetermined intervals by the AD converter 42 regardless of the amplitudes of the voltage instruction values Vu*, Vv*, and Vw*. Specifically, in the first-half period, the flatbed modulation is performed so that the first-half duty instruction value Dw_a of the W phase as the smallest duty becomes the duty lower-limit value x11. In the second-half period, the flattop modulation is performed so that the second-half duty instruction value Du_b of the U phase as the duty of the largest phase becomes the duty upper-limit value x21. As a result, the voltage vector interval V7 in the first-half period and the voltage vector interval V0 in the second-half period become the minimum time Tm. The voltage vector interval V0 in the first-half period and the voltage vector interval V7 in the second-half period become the minimum time Tm or longer.

In FIG. 19C, the current detection value Ic11 detected at the first sampling timing t11 is a value detected in the voltage vector interval V2, so that the W-phase current Iw is computed on the basis of the current detection value Ic11 in the phase current computing unit 61. Since the current detection value Ic13 detected at the third sampling timing t13 is a value detected in the voltage vector interval V1, the U-phase current Iu is computed on the basis of the current detection value Ic13 in the phase current computing unit 61. The V-phase current Iv is computed on the basis of the U-phase current Iu and the W-phase current Iw.

The current detection value Ic12 detected at the second sampling timing t12 and the current detection value Ic14 detected at the fourth sampling timing t14 are used for offset correction.

The relation between the current detection values used for computation of the currents Iu, Iv, and Iw of respective phases and the amplitudes of the voltage instruction values Vu*, Vv*, and Vw* will be described.

In the embodiment, regardless of the amplitudes of the voltage instruction values Vu*, Vv*, and Vw*, on the basis of the current detection values detected without changing the sampling timings t11, t12, t13, and t14 by the AD converter 42, the currents Iu, Iv, and Iw of the respective phases can be computed.

As described with reference to FIG. 17C, in the case where the amplitude of the voltage instruction values Vu*, Vv*, and Vw* is less than the first predetermined value THa1, the phase current computing unit computes the currents Iu, Iv, and Iw of the respective phases on the basis of the current detection value Ic12 detected at the second sampling timing t12 and the current detection value Ic14 detected at the fourth sampling timing t14.

As described with reference to FIG. 18C, in the case where the amplitude of the voltage instruction values Vu*, Vv*, and Vw* is equal to or larger than the first predetermined value THa1 and is less than the second predetermined value THa2, the phase current computing unit 61 computes the currents Iu, Iv, and Iw of the respective phases on the basis of the current detection value Ic11 detected at the first sampling timing t11 and the current detection value Ic14 detected at the fourth sampling timing t14.

As described with reference to FIG. 19C, in the case where the amplitude of the voltage instruction values Vu*, Vv*, and Vw* is equal to or larger than the second predetermined value THa2, the phase current computing unit 61 computes the currents Iu, Iv, and Iw of the respective phases on the basis of the current detection value Ic11 detected at the first sampling timing t11 and the current detection value Ic13 detected at the third sampling timing t13.

That is, in the embodiment, the values used for computation of the currents Iu, Iv, and Iw of the respective phases in the current detection values Ic11 to Ic14 detected at the sampling timings of the predetermined intervals are switched according to the amplitudes of the voltage instruction values Vu*, Vv*, and Vw*.

In the embodiment, a predetermined range including the upper limit or the lower limit of the duty by which the length of the dead time changes is called an output avoidance duty. Concretely, duties less than the duty lower-limit value x11 (for example, 4%) and duties larger than the duty upper-limit value x21 (for example, 96%) are set as output avoidance duties. Consequently, in periods corresponding to the output avoidance duties including the upper and lower ends of the PWM reference signal P, the adjusting process is performed so as to realize a zero voltage vector in which all of the upper SW 21 to 23 are on or all of the lower SW 24 to 26 are on. In other words, the zero voltage vector interval is provided twice in each of the first-half period and the second-half period. Therefore, the output avoidance duty by which the length of the dead time changes is not output, so that distortion of current accompanying a change in the length of the dead time can be prevented, and torque ripple, sound, and vibration can be reduced.

Figure 20:
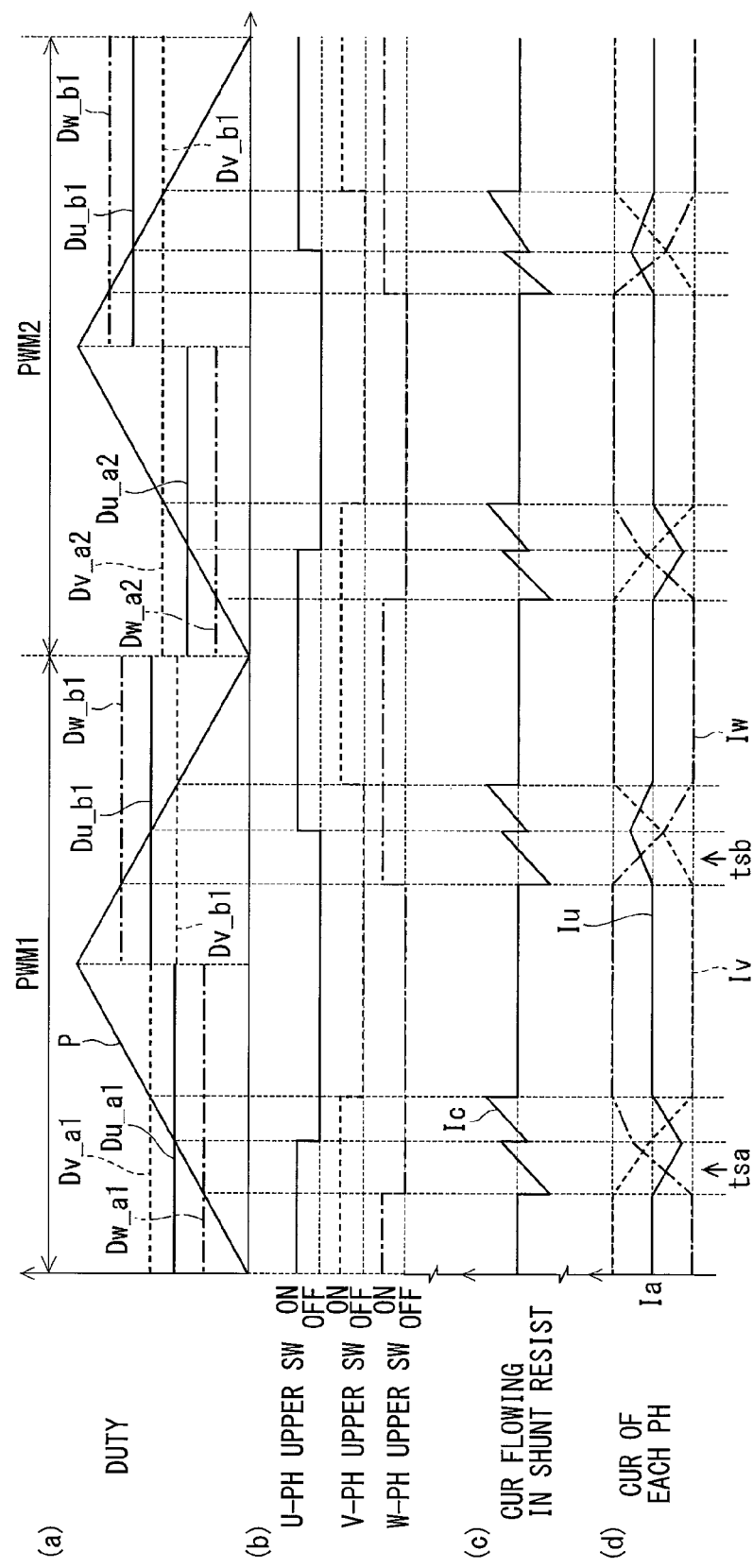
FIG. 20 is an explanatory diagram for explaining the relation between a duty and a shunt resistor in the first embodiment of the disclosure.

Next, currents flowing in the shunt resistor 40 will be described with reference to FIG. 20. FIG. 20 schematically illustrates duties of the respective phases in which the amplitude of the voltage instruction values Vu*, Vv*, and Vw* is less than the first predetermined value THa1. In FIG. 20 and the following drawings, the first cycle of PWM is written as "PWM1" and the second cycle is written as "PWM2".

In the embodiment, the current detection is performed in the single shunt resistor 40, so that the current detection is performed in the active voltage vector period. In other words, the current detection is performed at a timing which is not the peak of the PWM reference signal P.

In the case of performing the current detection at the peak of the PWM reference signal P, the current detection is performed at almost the center of a ripple in each of the phase currents Iu, Iv, and Iw, so that it is not easily influenced by the ripple.

On the other hand, in the case of performing the current detection at timings which are not at the peak of the PWM reference signal P by the single shunt resistor 40 like in the embodiment, the current detection value Ic used for computation of the currents Iu, Iv, and Iw of the respective phases includes the influence of the ripple. In the case where the duty is corrected upward, the ripple current fluctuates upward. In the case where the duty is corrected downward, the ripple current fluctuates downward.

In the embodiment, the duty is corrected so that the active voltage vector interval for performing current detection becomes equal to or longer than a predetermined period in which current can be detected.

For example, the W-phase current Iw will be described. The W-phase current Iw is corrected in the negative direction in the first-half period and corrected in the positive direction in the second-half period. In the embodiment, on the basis of a current detection value Im detected at a predetermined timing tsa in the first-half period in which the correction is performed in the negative direction and a current detection value Ip detected at a predetermined timing tsb in the second-half period in which the correction is performed in the positive direction, a center current Ia of the ripple is calculated, and the center current Ia is set as a correction current Iwc. In such a manner, a current detection error due to the influence of the ripple can be reduced. In the example of FIG. 20, "the current detection value Ip detected at the predetermined timing tsb in the second-half period in which the correction is performed in the positive direction" corresponds to a "current detection value at the time of positive-side correction", and "the current detection value Im detected at the predetermined timing tsa in the first-half period in which the correction is performed in the negative direction" corresponds to a "current detection value at the time of negative-side correction".

The center current Ia is, as expressed by the equation (61), an average value of the current detection value Im in the first-half period and the current detection value Ip in the second-half period.

$$Ia = (Im + Ip) \times 0.5 \qquad (61)$$

Figure 21:
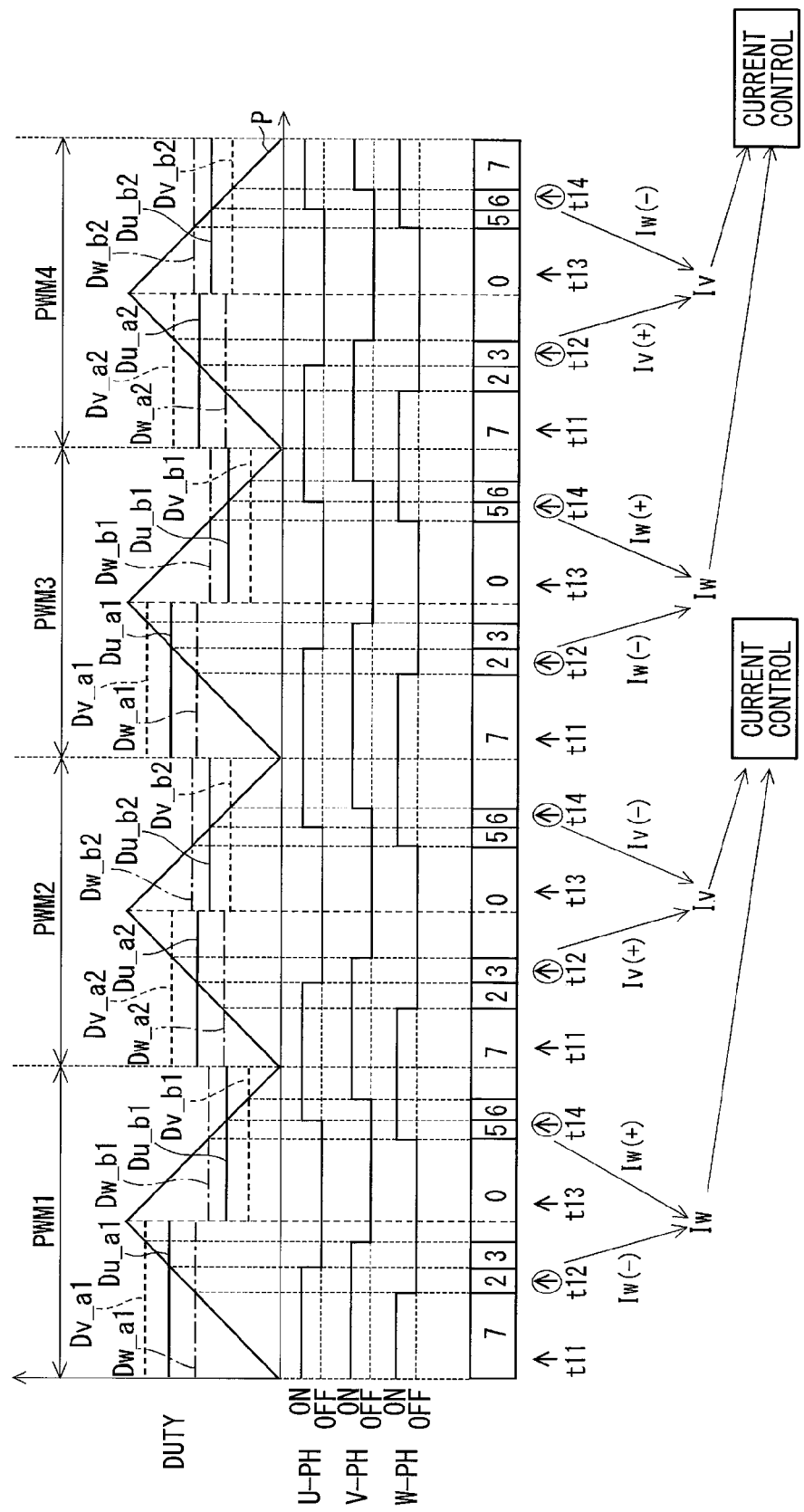
FIG. 21 is an explanatory diagram for explaining current control according the first embodiment of the disclosure.

FIG. 21 is a diagram for explaining the current control when the amplitude of the voltage instruction values Vu*, Vv*, and Vw* is less than the first predetermined value THa1. PWM odd-numbered cycles (PWM1 and PWM3) correspond to the first cycle described with reference to FIG. 17C, and PWM even-numbered cycles (PWM2 and PWM4) correspond to the second cycle described with reference to FIG. 17D.

In FIG. 21, the current detection value at the sampling timing t12 in the first cycle is indicated as Iw(−), and the current detection value at the sampling timing t14 is indicated as Iw(+). The current detection value at the sampling timing t12 in the second cycle is indicated as Iv(+), and the current detection value at the sampling timing t14 is indicated as Iv(−).

As illustrated in FIG. 21, the W phase of the current detection value Iw(−) detected in the first-half period of the first PWM cycle is corrected in the negative direction in the voltage vector interval V2. The W phase of the current detection value Iw(+) detected in the first-half period of the first PWM cycle is corrected in the positive direction in the voltage vector interval V5. In the embodiment, an average value of the current detection values Iw(−) and Iw(+) is set as a correction current Iwc as the corrected W-phase current. The third PWM cycle is similar to the above.

The V phase of the current detection value Iv(+) detected in the first-half period of the second PWM cycle is corrected in the positive direction in the voltage vector interval V3. The V phase of the current detection value Iv(−) detected in the second-half period of the second PWM cycle is corrected in the negative direction in the voltage vector interval V6. In the embodiment, an average value of the current detection values Iv(+) and Iv(−) is set as a V-phase correction current Ivc as the corrected V-phase current. The fourth PWM cycle is similar to the above.

On the basis of the V-phase correction current Ivc and the W-phase correction current Iwc, a U-phase correction current Iuc as a corrected U-phase current is computed.

In the embodiment, the W-phase correction current Iwc is computed on the basis of the current detection values Iw(−) and Iw(+) of the first cycle and the V-phase correction current Ivc is computed on the basis of the current detection values Iv(+) and Iv(−) of the second cycle. The U-phase correction current Iuc is computed by "the sum of three phases=0" on the basis of the W-phase correction current Iwc and the V-phase correction current Ivc. That is, in the embodiment, the correction currents Iuc, Ivc, and Iwc are computed every two cycles and current control is performed. In the example of FIG. 21, the correction currents Iuc, Ivc, and Iwc are computed on the basis of the current detection values Iw(−), Iw(+), Iv(+), and Iv(−) of the first and second cycles and, on the basis of the computed correction currents Iuc, Ivc, and Iwc, the first-half duty instruction values Du_a1, Dv_a1, and Dw_a1 of the first cycle, the second-half duty instruction values Du_b1, Dv_b1, and Dw_b1 of the first cycle, the first-half duty instruction values Du_a2, Dv_a2, and Dw_a2 of the second cycle, and the second-half duty instruction values Du_b2, Dv_b2, and Dw_b2 of the second cycle are computed.

The computed duty instruction values Du_a1, Dv_a1, Dw_a1, Du_b1, Dv_b1, and Dw_b1 of the first cycle are used for a control of the fifth cycle, and the duty instruction values Du_b2, Dv_b2, Dw_b2 of the second cycle are used for a control of the sixth cycle. That is, the duty instruction values computed on the basis of the current detection values in the (2n−1)th cycle and the (2n)th cycle are used for a control of the (2n+3)th cycle and the (2n+4)th cycle.

In the example of FIG. 21, the current detection values Iw(+) and Iv(+) correspond to the "current detection values on the positive-side correction", and the current detection values Iw(−) and Iv(−) correspond to the "current detection values on the negative-side correction".

As described specifically above, the power conversion apparatus 1 has the inverter unit 20, the shunt resistor 40, the AD converter 42, and the control unit 60.

The inverter unit 20 includes the upper SW 21 to 23 disposed on the high potential side and the lower SW 24 to 26 disposed on the low potential side. The shunt resistor 40 is connected between the inverter unit 20 and the negative side of the battery 80. The AD converter 42 obtains the current detection value Ic from the shunt resistor 40 at the sampling timings as predetermined intervals.

The control unit 60 controls the on/off operations of the upper SW 21 to 23 and the lower SW 24 to 26 on the basis of the PWM reference signal P and the duty instruction values.

The control unit 60 has the phase current computing unit 61, the controller 63, the two-phase to three-phase converting unit 64, and the duty transforming unit 70.

The phase current computing unit 61 computes the currents Iu, Iv, and Iw of the respective phases passed to the phases of the winding 15 on the basis of the current detection value Ic.

The controller 63 computes a d-axis voltage instruction value Vd* and a q-axis voltage instruction value Vq* on the basis of the currents Iu, Iv, and Iw of the respective phases. The two-phase to three-phase converting unit 64 computes the voltage instruction value Vu*, Vv*, and Vw* according to the voltages applied to the U-phase coil 11, the V-phase coil 12, and the W-phase coil 13 on the basis of the d-axis voltage instruction value Vd* and the q-axis voltage instruction value Vq*.

The duty transforming unit 70 computes the duty instruction values Du_a1, Dv_a1, Dw_a1, Du_b1, Dv_b1, Dw_b1, Du_a2, Dv_a2, Dw_a2, Du_b2, Dv_b2, and Dw_b2 adjusted so that the active voltage vector interval for detecting the current detection value Ic becomes equal to or longer than the predetermined time and the current detection value Ic can be detected at sampling timings.

On the basis of the current detection values Iw(+) and Iv(+) at the time of the positive-side correction as the current detection values when the duty is corrected to the positive side and the current detection values Iw(−) and Iv(−) at the time of the negative-side correction as the current detection values when the duty is corrected to the negative side in the same phase, the phase current computing unit 61 computes the correction currents Iuc, Ivc, and Iwc as the currents Iu, Iv, and Iw of the respective phases.

In the embodiment, the duty instruction value is adjusted so that the current detection value Ic can be detected at the sampling timings as predetermined intervals, so that the current detection value Ic can be obtained with the simple configuration.

The duty is corrected so that the active voltage vector interval in which the current detection value Ic is detected becomes equal to or longer than a predetermined period. When the duty is corrected to the positive side, the ripple current also fluctuates to the positive side. When the duty is corrected to the negative side, the ripple current also fluctuates to the negative side. On the basis of the current detection values Iw(+) and Iv(+) when the duty is corrected to the positive side and the current detection values Iw(−) and Iv(−) when the duty is corrected to the negative side, the correction currents Iuc, Ivc, and Iwc as the corrected currents Iu, Iv, and Iw of the respective phases are computed. Since the ripple current can be properly corrected in such a manner, a current detection error is reduced. Since the current detection error is reduced and the distortion of the current is reduced, a torque ripple, sound, and vibration can be reduced.

The phase current computing unit 61 computes the W-phase correction current Iwc on the basis of the average value of the current detection values Iw(+) and Iw(−). The phase current computing unit 61 computes the V-phase correction current Ivc on the basis of the average value of the current detection values Iv(+) and Iv(−). Since the sum of three phases=0, the phase current computing unit 61 computes the U-phase correction current Iuc on the basis of the average value of the V-phase correction current Ivc and the W-phase correction current Iwc.

In such a manner, the ripple-corrected correction currents Iuc, Ivc, and Iwc can be properly computed by the simple computation.

The duty transforming unit 70 has the duty converting unit 72, the current detection period assurance computing unit 73, and the current detection timing adjustment computing unit 74.

The duty converting unit 72 converts the voltage instruction values Vu*, Vv*, and Vw* to the duty conversion values Du_r, Dv_r, and Dw_r.

The current detection period assurance computing unit 73 corrects the duty conversion values Du_r, Dv_r, and Dw_r so that the active voltage vector interval becomes equal to or longer than the predetermined period in the first-half period and the second-half period in cycles of one or more predetermined multiple of the PWM reference signal P.

The current detection timing adjustment computing unit 74 computes the first-half duty instruction values Du_a1, Dv_a1, Dw_a1, Du_a2, Dv_a2, and Dw_a2 and the second-half duty instruction values Du_b1, Dv_b1, Dw_b1, Du_b2, Dv_b2, and Dw_b2 as duty instruction values so that the voltage vector interval V0 in which the lower SW 24 to 26 of all of the phases are on and the voltage vector interval V7 in which the upper SW 21 to 23 of all of phases are on become equal to or longer than the minimum time Tm which is determined from the dead time period in which both of the upper SW 21 to 23 and the lower SW 24 to 26 corresponding to a same phase of the winding, and the voltage vector intervals V0 and V7 are included in at least in one of the first-half period and the second-half period.

In the embodiment, the adjustment is made so that the voltage vector intervals V0 and V7 as the zero voltage vectors become equal to or longer than the minimum time Tm determined from the dead time. That is, in the embodiment, the PWM control is performed without using a duty in the range in which the instruction voltage and the duty do not mach.

The duty is adjusted so that both of the voltage vector intervals V0 and V7 which are equal to or longer than the minimum time are included in at least one of the first-half period and the second-half period. Consequently, even when the duty is changed between the first-half period and the second-half period of one PWM cycle, a pulse is not reduced in association with the switching of the duty.

In the case where the duty of the largest phase is less than the upper limit (for example, 102%) of the duty at the upper end of the PWM reference signal P and the duty of the smallest phase is larger than the lower limit (for example, −2%) of the duty at the lower end of the PWM reference signal P, both of the voltage vector intervals V0 and V7 are included in the first-half period and the second-half period. In particularly, in the embodiment, the duty lower-limit value x11 and the duty upper-limit value x21 are set so that the voltage vector intervals V0 and V7 become equal to or longer than the minimum time.

Consequently, mismatch between the voltage instruction and the duty due to the influence of the dead time does not occur, and distortion of the current waveform can be reduced, so that a torque ripple, sound, and vibration can be reduced.

Since the duty conversion values Du_r, Dv_r, and Dw_r are corrected so that the active voltage vector interval for performing current detection becomes equal to or longer than a predetermined period, the current detection value Ic can be properly detected.

In the case where the amplitude of the voltage instruction values Vu*, Vv*, and Vw* is less than the first predetermined value THa1, the current detection timing adjustment computing unit 74 makes the duty instruction value in the odd-numbered cycle and the duty instruction value in the even-numbered cycle different using the predetermined multiple of cycles as a reference. In the case where the amplitude of the voltage instruction values Vu*, Vv*, and Vw* is less than the first predetermined value THa1, the current detection value Iw(+) at the time of positive-side correction and the current detection value Iw(−) at the time of negative-side correction of one phase are detected and the correction current Iwc of the phase can be computed in the odd-numbered cycle, and the current detection value Iv(+) at the time of positive-side correction and the current detection value Iv(−) at the time of negative-side correction of another phase are detected and the correction current Ivc of the phase can be computed in the even-numbered cycle. Consequently, without changing the sampling timing, the correction currents Iuc, Ivc, and Iwc can be computed properly on the basis of the current detection values detected in the odd-numbered and even-numbered cycles.

In the embodiment, the values used for computation of the currents Iu, Iv, and Iw of the respective phases in the current detection values sampled by the AD converter 42 are switched according to the amplitude of the voltage instruction values Vu*, Vv*, and Vw*. By the operation, the currents Iu, Iv, and Iw of the respective phases can be computed on the basis of the current detection values detected at proper timings in accordance with the amplitude of the voltage instruction values Vu*, Vv*, and Vw*.

The electric power steering apparatus 100 has the power converting apparatus 1 and the motor 10 for outputting an auxiliary torque which supports steering of the driver. In the power converting apparatus 1, a current detection error is reduced and distortion in the current is reduced, so that the torque ripple, sound, and vibration can be reduced.

In the embodiment, the phase current computing unit 61 corresponds to a "phase current computing device", the controller 63 and the two-phase to three-phase converting unit 64 correspond to a "voltage instruction value computing device", the duty transforming unit 70 corresponds to a "duty transforming device", the duty converting unit 72 corresponds to a "duty converting device", the current detection period assurance computing unit 73 corresponds to a "correcting device", and the current detection timing adjustment computing unit 74 corresponds to an "adjusting device". The first predetermined value THa1 corresponds to a "predetermined value".

Second Embodiment

A second embodiment of the present disclosure will be described with reference to FIG. 22. Since the second embodiment is different from the first embodiment with respect to the current control cycles, the different point will be mainly described.

In the first embodiment, the currents Iu, Iv, and Iw of the respective phases are computed every two cycles and the current control is performed.

Figure 22:
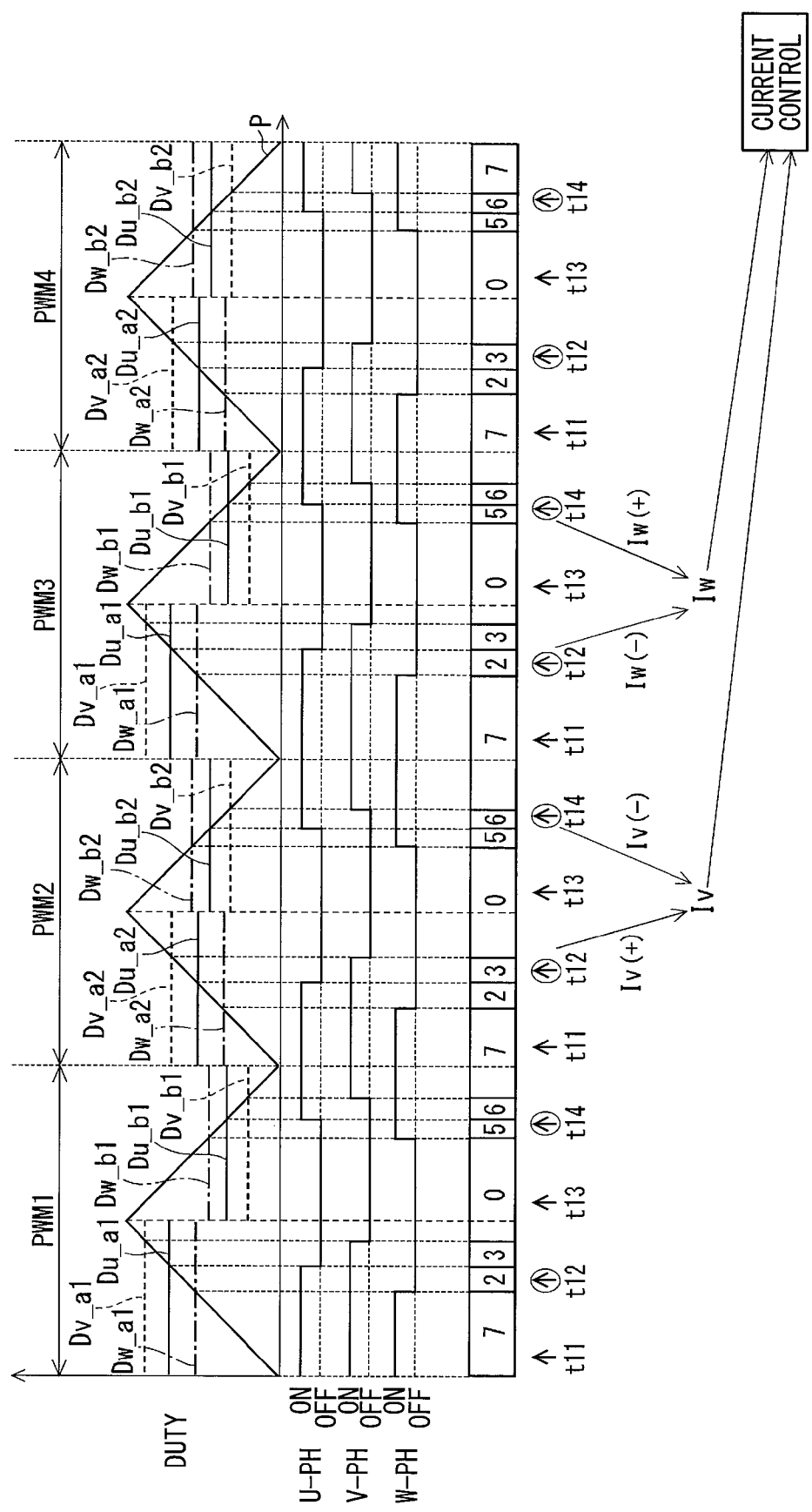
FIG. 22 is an explanatory diagram for explaining current control according to a second embodiment of the disclosure.

As illustrated in FIG. 22, in the second embodiment, the current control is performed every four cycles. Concretely, the phase current computing unit 61 computes the V-phase current Iv on the basis of an average value of the current detection values Iv(+) and Iv(−) detected in the second cycle. The phase current computing unit 61 also computes the W-phase current Iw on the basis of an average value of the current detection values Iw(−) and Iw(+) detected in the third cycle. The U-phase current Iu is computed by "the sum of three phases=0".

On the basis of the calculated currents Iu, Iv, and Iw of the respective phases, the first-half duty instruction values Du_a1, Dv_a1, and Dw_a1 of the first cycle, the second-half duty instruction values Du_b1, Dv_b1, and Dw_b1 of the first cycle, the first-half duty instruction values Du_a2, Dv_a2, and Dw_a2 of the second cycle, and the second-half duty instruction values Du_b2, Dv_b2, and Dw_b2 of the second cycle are computed.

Also with such a configuration, effects similar to those of the foregoing embodiment are produced. By making the current control cycle longer and decreasing the number of computation times, the computation load can be reduced.

Third Embodiment

In the foregoing embodiment, a current detection value when the correction is made in the positive direction in one PWM cycle and a current detection value when the correction is made in the negative direction in one PWM cycle in the case where the amplitude of the voltage instruction values Vu*, Vv*, and Vw* is less than the first predetermined value THa1 are obtained, the center current Ia is computed, and the current control is performed on the basis of the center current Ia.

On the other hand, when the amplitude of the voltage instruction values Vu*, Vv*, and Vw* is equal to or larger than the first predetermined value THa1, the currents Iu, Iv, and Iw of the respective phases are computed on the basis of either the case where the duty is corrected to the positive side or the case where the duty is corrected to the negative side, so that distortion of the current waveform cannot be corrected.

In the embodiment, therefore, when the amplitude of the voltage instruction values Vu*, Vv*, and Vw* is less than the first predetermined value THa1, a correction factor Y is computed. On the basis of the computed correction factor Y, the currents Iu, Iv, and Iw of the respective phases in the case where the amplitude of the voltage instruction values Vu*, Vv*, and Vw* is equal to or larger the first predetermined value THa1 are corrected. The following computations are performed by the phase current computing unit 61. Hereinafter, the correction factors of the respective phases will be properly called Yu, Yv, and Yw.

In the embodiment, when the amplitude of the voltage instruction values Vu*, Vv*, and Vw* is less than the first predetermined value THa1, the first-half duty temporary values Du_at, Dv_at, and Dw_at and the second-half duty temporary values Du_bt, Dv_bt, and Dw_bt computed by the current detection period assurance computing unit 73 are converted to voltages to obtain correction values Vu_ac, Vv_ac, and Vw_ac in the first-half period and the correction values Vu_bc, Vv_bc, and Vw_bc in the second-half period. As the correction values, voltages obtained from the duties after the adjusting process may be used.

When it is assumed that the voltage instruction values prior to correction satisfy Vv*>Vu*>Vw*, the correction voltages Vu_ac, Vv_ac, and Vw_ac in the first-half period and the correction voltages Vu_bc, Vv_bc, and Vw_bc in the second-half period are expressed by equations (71) to (76).

$$Vu\_ac = Vu^* \tag{71}$$

$$Vv\_ac = Vv^* + \alpha \tag{72}$$

$$Vw\_ac = Vw^* + \beta \tag{73}$$

$$Vu\_bc = Vu^* \tag{74}$$

$$Vv\_bc = Vv^* - \alpha \tag{75}$$

$$Vw\_bc = Vw^* - \beta \tag{76}$$

$\alpha$ in the equations denotes a correction amount of the V-phase voltage, and $\beta$ denotes a correction amount of the W-phase voltage. In the example, the correction amount $\alpha$ of the V-phase voltage is a value obtained by converting the first duty correction value C1 to a voltage. The correction amount $\beta$ of the W-phase voltage is a value obtained by converting the third duty correction value C3 to a voltage.

At this time, a neutral voltage Vn_a in the first-half period and a neutral voltage Vn_b in the second-half period are expressed by equations (77) and (78), respectively.

$$Vn\_a = (Vu\_ac + Vv\_ac + Vw\_ac)/3 \tag{77}$$

$$Vn\_b = (Vu\_bc + Vv\_bc + Vw\_bc)/3 \tag{78}$$

Hereinbelow, the V phase will be described as an example. Description is similar also for the U phase and the W phase.

The voltage difference value $\Delta Vv$ as the difference between the V-phase voltage in the first-half period and the V-phase voltage in the second-half period is expressed by the equation (79).

$$\Delta Vv = (Vv\_ac - Vn\_a) - (Vv\_bc - Vn\_b) \tag{79}$$

When the change ratio of the current to the voltage is a V-phase correction factor Yv, a ripple current Rv as a fluctuation range of the V-phase current Iv is expressed by the equation (80) on the basis of the voltage difference value.

$$Rv = Yv \times (\Delta Vv) \tag{80}$$

When the current detection value at the time of positive-side correction used for computation of the V-phase current Iv is Iv(+) and the current detection value at the time of the negative-side correction is Iv(−), the correction factor Yv as a tilt of the V-phase ripple current Rv is expressed by the equation (81). The current detection value Iv1 is a value when the duty is corrected to the positive side, and the current detection value Iv2 is a value when the duty is corrected to the negative side.

$$Yv = (Iv(+) + Iv(-))/(\Delta Vv) \tag{81}$$

The V-phase correction current Ivc corrected by the correction factor Yv on the basis of the current detection value Iv1 is expressed by the equation (82). The correction factor Yv can be also regarded as the tilt of the V-phase ripple current Rv.

$$Ivc = Iv(+) + Yv \times (Vv\_ac - Vn\_a)/2 \tag{82}$$

Computation can be similarly performed also on the basis of the current detection value Iv(−).

Similar computation is performed also for the W phase.

In the embodiment, when the amplitude of the voltage instruction values Vu*, Vv*, and Vw* is less than the first predetermined value THa1, the correction factor Yv expressed by the equation (81) is computed and learnt. The correction factor Yv is used for correction in the computation of the V-phase correction current Ivc when the amplitude of the voltage instruction value Vu*, Vv*, and Vw* is equal to or larger than the first predetermined value THa1.

For example, as illustrated in FIG. 18, the V-phase correction current Ivc based on the current detection value Ic14 is expressed by the equation (83).

$$Ivc = Ic14 - Yv \times (Vv\_bc - Vn\_b)/2 \tag{83}$$

Consequently, even in the case where the amplitude of the voltage instruction values Vu*, Vv*, and Vw* is large, the correction currents Iuc, Ivc, and Iwc of the respective phases obtained by correcting the ripple currents can be computed, so that a current detection error can be reduced.

In the embodiment, the phase current computing unit 61 computes the correction factor Y on the basis of the current detection value Iv(+) at the time of positive-side correction and the current detection value Iv(−) at the time of negative-side correction and the correction currents Iuc, Ivc, and Iwc are computed on the basis of the correction factor Y. Consequently, the currents Iu, Iv, and Iw of the respective phases are properly corrected, and distortion in the current can be reduced.

The phase current computing unit 61 computes the correction currents Iuc, Ivc, and Iwc by using the correction factor Y computed when the amplitude of the voltage instruction values Vu*, Vv*, and Vw* is less than the first predetermined value THa1. Consequently, regardless of the amplitude of the voltage instruction values Vu*, Vv*, and Vw*, the correction currents Iuc, Ivc, and Iwc in which ripple is corrected can be computed, and distortion of the current can be reduced.

Particularly, in the embodiment, the power conversion apparatus 1 is applied to the electric power steering apparatus 100. Since the motor 10 of the electric power steering apparatus 100 repeats start and stop relatively frequently, there are many occasions that the amplitude of the voltage instruction values Vu*, Vv*, and Vw* becomes less than the first predetermined value THa1. Therefore, as compared with an apparatus in which the motor 10 is continuously driven, the correction factor Y can be computed and learnt with higher frequency.

The third embodiment produces effects similar to those of the foregoing embodiments.

Fourth Embodiment

In the foregoing embodiment, on the basis of the current detection value Iv(+) at the time of positive-side correction, the current detection value Iv(−) at the time of the negative-side correction, and the correction voltage, the correction factor used for correction of the currents of the respective phases is computed.

In the fourth embodiment, the correction factor Y is computed in consideration of a tilt of each of the currents Iu, Iv, and Iw of the respective phases and used for correcting the currents of the respective phases. In the embodiment, in a manner similar to the third embodiment, although the V-phase current Iv will be described as an example, description is similar also for the U phase and the W phase.

A method of computing the correction factor Yv of the V phase in the embodiment will be described with reference to FIG. 23.

Figure 23:
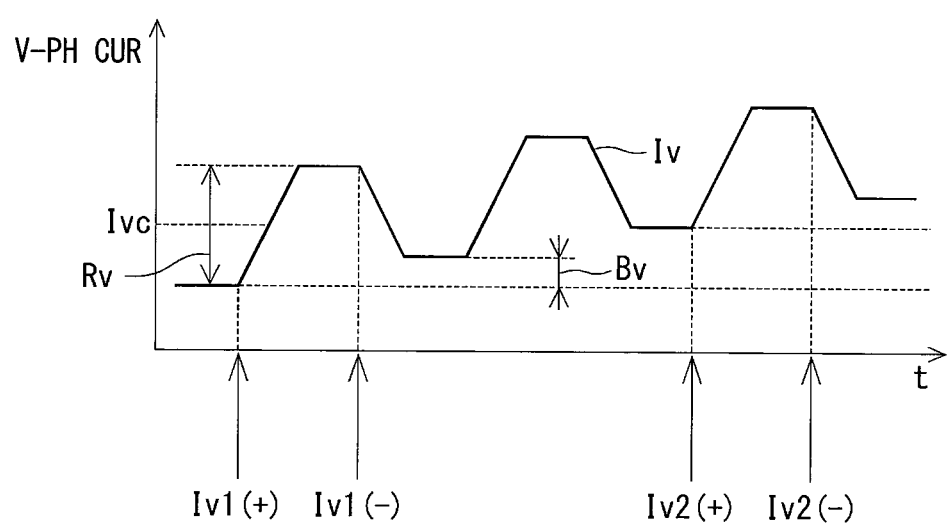
FIG. 23 is an explanatory diagram for explaining ripple current in a fourth embodiment of the disclosure.

In the example of FIG. 23, the current detection value at the time of positive-side correction in the m-th cycle is expressed as Iv1(+), the current detection value at the time of positive-side correction in the (m+2)th cycle is expressed as Iv2(+), the current detection value at the time of negative-side correction in the m-th cycle is expressed as Iv1(−), and the current detection value at the time of negative-side correction in the (m+2)th cycle is expressed as Iv2(−). It is regarded that the current detection values Iv1(+) and Iv2(+) at the time of positive-side correction are minimum values in the cycle, and the current detection values Iv1(−) and Iv2(−) at the time of negative-side correction are maximum values in the cycle. The interval between Iv1(+) and Iv2(+) and the interval between Iv1(−) and Iv2(−) correspond to two PWM cycles.

In FIG. 23, the ripple current as the fluctuation range of the V-phase current is indicated as Rv, and a change amount in the V-phase current Iv is shown as Bv.

The difference ΔI1v between the current detection values Iv11 and Iv22 as the interval of 2.5 PWM cycles is expressed by the equation (91).

$$\Delta I1v = Iv22 - Iv11 = Rv + 2.5Bv \tag{91}$$

The difference ΔI2v between the current detection values Iv11 and Iv12 as the interval of a 0.5 PWM cycle is expressed by the equation (92).

$$\Delta I2v = Iv12 - Iv11 = Rv + 0.5Bv \tag{92}$$

From the equations (91) and (92), the ripple current Rv is expressed by the equation (93).

$$Rv = (5 \times \Delta I2v - \Delta I1v)/4 \tag{93}$$

Since the ripple current Rv is expressed by the equation (80), the correction factor Yv of the V phase is expressed by the equation (94).

$$Yv = Rv/(\Delta Vv) \tag{94}$$

The correction current Ivc of the V phase corrected with the correction factor Yv is expressed by the equation (95-1).

$$Ivc = Iv1(+) + Yv \times (Vv\_ac - Vn\_a)/2 \tag{95-1}$$

The ripple current Rv may be computed by the following equations (96) and (97).

The difference ΔI3v between the current detection values Iv1(+) and Iv2(+) as the interval of two PWM cycles is expressed by the equation (96).

$$\Delta I3v = 2Bv \tag{96}$$

From the equations (92) and (96), the ripple current Rv is expressed by the equation (97).

$$Rv = (4 \times \Delta I2v - \Delta I3v)/4 \tag{97}$$

Although the example of computing the correction current Ivc of the V phase corrected with the correction factor Yv by the equation (95-1) has been described, a further correction may be performed in consideration of the point that the sampling timing is shifted from the peak of the PWM reference signal P.

For example, in the case where the sampling timing is behind the peak of the PWM reference signal P by Tsmp, the correction current Ivc of the V phase is expressed by the equation (95-2).

$$Ivc = Iv1(+) + Yv \times (Vv\_ac - Vn\_a)/2 - Yv \times Tsmp \tag{95-2}$$

In the case where the sampling timing is before the peak of the PWM reference signal P by Tsmp, the correction current Ivc of the V phase is expressed by the equation (95-3).

$$Ivc = Iv1(+) + Yv \times (Vv\_ac - Vn\_a)/2 + Yv \times Tsmp \tag{95-3}$$

By performing the computation as descried above, a correction in which the influence of a shift of the sampling timing from the peak of the PWM reference signal P is also considered can be made.

In the embodiment, the correction factor is computed in consideration of a change in the fundamental wave components in the currents Iu, Iv, and Iw of the respective phases, the currents Iu, Iv, and Iw of the respective phases can be properly corrected, and distortion in the current can be reduced.

Effects similar to those of the foregoing embodiments are produced.

Other Embodiments (A) In the foregoing embodiment, the voltage vectors V0 and V7 are included in both of the first-half period and the second-half period. By making the lower SW of the phase of the smallest duty always on through the first-half period or the second-half period, the duty 0% can be output. By making the upper SW of the largest duty always on through the first-half period or the second-half period, the duty 100% can be output. In the other embodiments, the duty lower-limit value x11 may be set to 0% or the duty upper-limit value x21 may be set to 100%. In this case, the voltage vector intervals V7 and V0 are included in one of the first-half period and the second-half period, and one of the voltage vector intervals V7 and V0 is included in the other one of the first-half period and the second-half period.

The duty lower-limit value x11 or the duty upper-limit value x21 may be changed according to the voltage instruction value. Concretely, in the case where the voltage instruction value is equal to or less than the predetermined value, by setting the duty lower-limit value x11 or the duty upper-limit value x21 to a value according to the dead time, the voltage vector intervals V0 and V7 are included in both of the first-half period and the second-half period. In the case where the voltage instruction value is equal to or larger than the predetermined value, by setting the duty lower-limit value x11 to 0% or setting the duty upper-limit value x21 to 100%, both the voltage vector intervals V0 and V7 are included in one of the first-half period and the second-half period, and one of the voltage vector intervals V0 and V7 is included in the other one of the first-half period and the second-half period. Accordingly, a voltage in a wider range can be applied.

In the case of applying the power conversion apparatus to an electric power steering apparatus, the duty lower-limit value x11 or the duty upper-limit value x21 is changed according to the steering speed in place of the voltage instruction value. In the case where the steering speed is equal to or less than predetermined speed, both of the voltage vector intervals V0 and V7 are made included in both of the first-half period and the second-half period. In the case where the steering speed is higher than the predetermined speed, both of the voltage vector intervals V0 and V7 may be made included in one of the first-half period and the second-half period, and one of the voltage vector intervals V0 and V7 may be included in the other one of the first-half period and the second-half period.

(B) In the foregoing embodiment, the correcting process and the adjusting process in the first-half period in one PWM cycle and those in the second-half period are different from each other. In another embodiment, the correcting device may perform any correction as long as the corrected duties in the first-half and second-half periods are cancelled out by, for example, exchanging the first-half period and the second-half period. The adjusting device may perform any adjustment as long as both of the voltage vector intervals V0 and V7 are included in at least one of the first-half period and the second-half period by, for example, exchanging the first-half period and the second-half period.

(C) The number of current detection times by the AD converter is not limited to four times per PWM cycle but may be any number.

(D) In the foregoing embodiment, the current detecting unit is provided between the inverter unit and the negative side of the DC power supply. In another embodiment, the current detecting unit may be provided between the inverter unit and the positive side of the DC power supply.

(E) In the embodiment, the carrier wave as the PWM reference signal is a triangle wave. In another embodiment, the PWM reference signal is not limited to the triangular wave but may be, for example, a saw-tooth wave or the like. For example, in the case of using a saw-tooth wave as the carrier wave, by performing a process while regarding the first cycle in two PWM cycles as a first-half period and the second cycle as the second-half period, similar effects are obtained.

In the foregoing embodiment, one cycle of the PWM reference signal is divided into the first-half period and the second-half period, and the correcting process and the adjusting process are performed. In another embodiment, a predetermined multiple of cycles which is one or larger of the PWM reference signal may be divided into the first-half period and the second-half period, and the correcting process and the adjusting process may be performed.

(F) In the foregoing embodiment, the rotating electrical machine is applied to the electric power steering apparatus. In another embodiment, for example, an in-vehicle electric motor may be used for an electric fan, an oil pump, a water pump, or the like. The electric motor may not be limited to the use for a vehicle.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power conversion apparatus comprising:
an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine;
a current detecting unit connected between the inverter unit and a positive side or a negative side of a DC power supply;
a current obtaining unit obtaining a current detection value from the current detecting unit with a fixed interval sampling timing; and
a control unit controlling an on-operation and an off-operation of the high-potential-side switching elements and the low-potential-side switching elements based on a PWM reference signal and a duty instruction value,
wherein the control unit includes:
a phase current computing device computing a phase current of each phase, which flows through one of the phases of the winding, based on the current detection value;
a voltage instruction value computing device computing a voltage instruction value, which relates to a voltage applied to the winding, based on the phase current of each phase; and
a duty computing device computing the duty instruction value, based on the voltage instruction value, which is adjusted in such a manner that an active voltage vector interval for detecting the current detection value is equal to or longer than a predetermined period required to obtain the current detection value and the current detection value is detected with the fixed interval sampling timing,
wherein the phase current computing device computes a correction current as a corrected phase current of each phase based on a positive-side corrected current detection value and a negative-side corrected current detection value,
wherein the positive-side corrected current detection value is obtained as the current detection value when a duty is adjusted to a positive side, and
wherein the negative-side corrected current detection value is obtained as the current detection value when the duty is adjusted to a negative side.

2. The power conversion apparatus according to claim 1, wherein the phase current computing device computes a correction factor based on the positive-side corrected current detection value and the negative-side corrected current detection value, and computes the correction current based on the correction factor.

3. The power conversion apparatus according to claim 2, wherein the phase current computing device computes the correction current using the correction factor, which is computed when an amplitude of the voltage instruction value is less than a predetermined value.

4. The power conversion apparatus according to claim 1, wherein the phase current computing device computes the correction current based on an average value of the positive-side corrected current detection value and the negative-side corrected current detection value.

5. The power conversion apparatus according to claim 1, wherein the duty computing device includes:
- a duty converting device converting the voltage instruction value to a duty conversion value;
- a correcting device correcting the duty conversion value in such a manner that the active voltage vector interval is equal to or longer than the predetermined period required to obtain the current detection value in each of a first-half period and a second-half period of predetermined one cycle or multiple cycles of the PWM reference signal; and
- an adjusting device computing a first-half duty instruction value and a second-half duty instruction value as the duty instruction value in such a manner that a first voltage vector interval and a second voltage vector interval are equal to or longer than minimum time, and the first voltage vector interval and the second voltage vector interval are included in at least one of the first-half period and the second-half period, wherein, in the first voltage vector interval, the low-potential-side switching elements of all of the phases turn on, wherein, in the second voltage vector interval, the high-potential-side switching elements of all of the phases turn on, wherein the minimum time is equal to or longer than a dead time period, and wherein, in the dead time period, both one high-potential-side switching element and one low-potential-side switching element corresponding to a same phase of the winding are turned off.

6. The power conversion apparatus according to claim 5, wherein, when an amplitude of the voltage instruction value is less than a predetermined value, the adjusting device sets the duty instruction value in an odd-numbered cycle and the duty instruction value in an even-numbered cycle to be different from each other in the predetermined multiple cycles.

7. The power conversion apparatus according to claim 1, wherein a value for computing the phase current of each phase is switched in accordance with an amplitude of the voltage instruction value, and wherein the value is selected from the current detection values sampled by the current obtaining unit.

8. An electric power steering apparatus comprising:
a power conversion apparatus according to claim 1; and
the rotating electrical machine for outputting an auxiliary torque assisting a steering operation of a driver.

* * * * *